(12) United States Patent
Sakata et al.

(10) Patent No.: US 10,589,665 B2
(45) Date of Patent: Mar. 17, 2020

(54) INFORMATION DISPLAY DEVICE AND INFORMATION DISPLAY METHOD

(71) Applicant: Mitsubishi Electric Corporation, Tokyo (JP)

(72) Inventors: Reiko Sakata, Tokyo (JP); Akiko Imaishi, Tokyo (JP); Shinsaku Fukutaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/066,569

(22) PCT Filed: Feb. 12, 2016

(86) PCT No.: PCT/JP2016/054142
§ 371 (c)(1),
(2) Date: Jun. 27, 2018

(87) PCT Pub. No.: WO2017/138150
PCT Pub. Date: Aug. 17, 2017

(65) Prior Publication Data
US 2019/0009714 A1 Jan. 10, 2019

(51) Int. Cl.
*B60Q 1/50* (2006.01)
(52) U.S. Cl.
CPC ............ *B60Q 1/50* (2013.01); *B60Q 2400/50* (2013.01)
(58) Field of Classification Search
CPC .............................. B60Q 1/50; B60Q 2400/50
USPC .................................... 340/425.5, 426.1, 463
See application file for complete search history.

(56) References Cited

U.S. PATENT DOCUMENTS

| 2005/0036325 A1* | 2/2005 | Furusawa | ............... B60Q 1/06 362/460 |
| 2008/0175012 A1* | 7/2008 | Shimaoka | ............. B60Q 1/085 362/464 |
| 2009/0187307 A1* | 7/2009 | Imaeda | .................. B60Q 1/525 701/36 |
| 2015/0203023 A1* | 7/2015 | Marti | ...................... B60O 1/00 340/425.5 |

(Continued)

FOREIGN PATENT DOCUMENTS

| JP | 2006-96326 A | 4/2006 |
| JP | 2008-47006 A | 2/2008 |

(Continued)

OTHER PUBLICATIONS

International Search Report issued in PCT/JP2016/054142 (PCT/ISA/210), dated Apr. 19, 2016.

*Primary Examiner* — Daryl C Pope
(74) *Attorney, Agent, or Firm* — Birch, Stewart, Kolasch & Birch, LLP.

(57) ABSTRACT

A vehicle state determination unit for determining a state of a vehicle, a display data output unit for outputting display data for displaying information indicating the state of the vehicle determined by the vehicle state determination unit, and an information displaying unit for displaying information to the outside of the vehicle in accordance with the display data output from the display data output unit are provided, in which the information displaying unit is configured to switch a display method of the information in accordance with an environment of the vehicle. By this, a degree of information transmission may be increased.

11 Claims, 13 Drawing Sheets

(56) References Cited

U.S. PATENT DOCUMENTS

2018/0004020 A1* 1/2018 Kunii ................ B60Q 1/04
2018/0334089 A1* 11/2018 Huang ............... B60Q 1/346

FOREIGN PATENT DOCUMENTS

| JP | 2008-143510 A | 6/2008 |
|----|---------------|--------|
| JP | 2009-166771 A | 7/2009 |
| JP | 4582151 B2 | 11/2010 |
| JP | 4650717 B2 | 3/2011 |
| JP | 2011-85712 A | 4/2011 |

* cited by examiner

Case In Which There Is Sufficient Irradiation Space on Road Surface in Front

Case In Which There Is No Sufficient Irradiation Space on Road Surface In Front and Irradiate Wall Surface Case In Which There Is Pedestrian Around

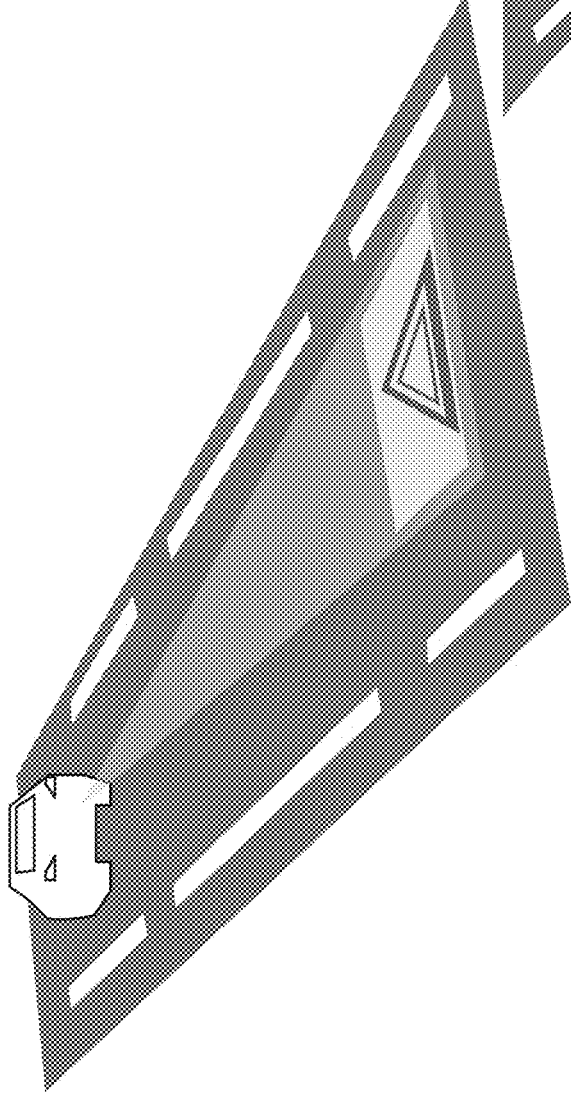
FIG. 11A  Case Where Road Is Straight
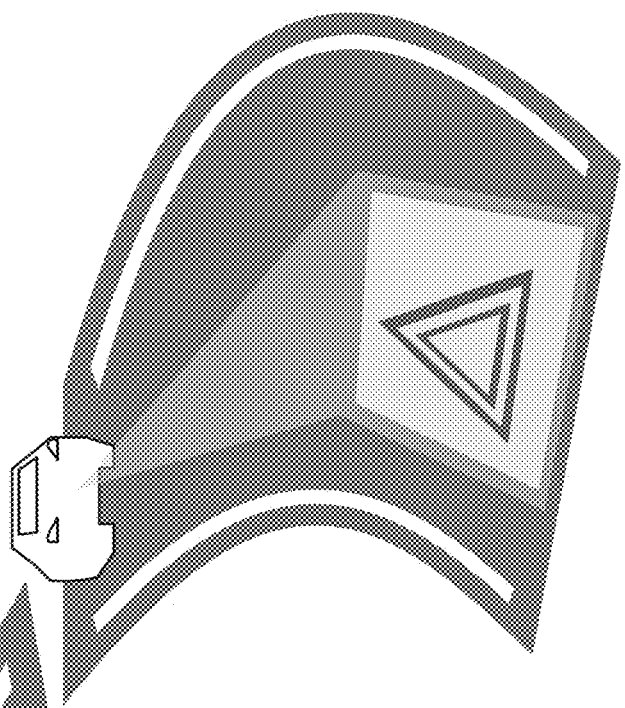
FIG. 11B  Case Where Road Is Curved
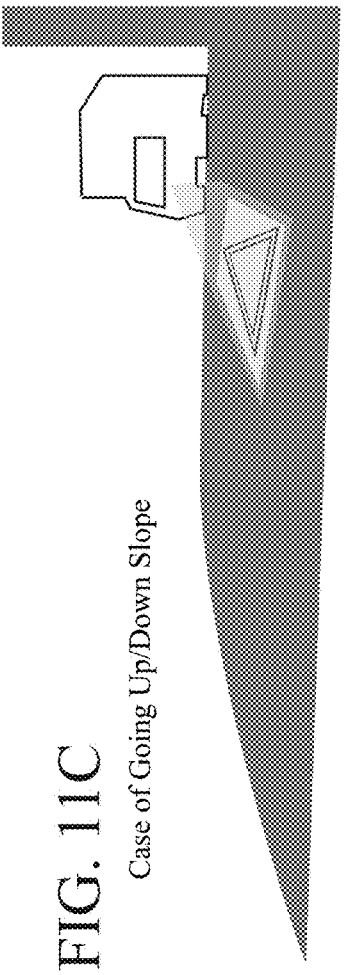
FIG. 11C  Case of Going Up/Down Slope Case In Which Speed of User's Vehicle Is High/
Case In Which Speed Limit of Road Is High Case In Which Speed of User's Vehicle Is Low/
Case In Which Speed Limit of Road Is Low Information Displaying Area Information Displaying Area Light Emitting Device
Enlarge Display

INFORMATION DISPLAY DEVICE AND INFORMATION DISPLAY METHOD

TECHNICAL FIELD

The present invention relates to an information display device and an information display method for displaying information to the outside of a vehicle.

BACKGROUND ART

Patent Literature 1 below discloses an information display device for displaying information to the outside of a vehicle.

The information display device includes a projecting means for projecting information such as a speed of the vehicle on a road.

In addition, the information display device includes an obstacle detection means for detecting an element which is an obstacle to the projection of the information when the projecting means projects the information on the road, and in a case in which an obstructive element is present, a projection position of the information is changed.

CITATION LIST

Patent Literatures

Patent Literature 1: JP 2009-166771 A (for example, paragraphs [0004] and [0016])

SUMMARY OF INVENTION

Technical Problem

Since the conventional information display device is configured as described above, it is possible to project the information to a position not obstructive to the projection of information. However, the position not obstructive to the projection of the information is not always a position where passengers of other vehicles and pedestrian may easily see the information. Also, a method of projecting the information is not switched depending on whether there is an obstructive element. For this reason, there is a problem in that the information cannot be correctly transmitted.

The present invention is achieved to solve the above-described problem, and an object thereof is to obtain an information display device and an information display method capable of increasing a degree of information transmission.

Solution to Problem

An information display device according to the present disclosure includes a processor, and a memory storing instructions which, when executed by the processor, causes the processor to perform processes of: determining a state of a vehicle, outputting display data for displaying information indicating the determined state of the vehicle, detecting a speed limit of a road on which the vehicle travels as an environment of the vehicle; and an information display to display information to an outside of the vehicle in accordance with the output display data, wherein the information display includes a light irradiation unit to display the information indicating the state of the vehicle on a projection surface by irradiating the projection surface outside the vehicle with light in accordance with the output display data, and the light irradiation unit switches an angle of the light irradiated to the projection surface in accordance with the detected speed limit.

Advantageous Effects of Invention

According to the present invention, since the light irradiation unit of the information display is configured to switch the angle of the light irradiated to the projection surface in accordance with the detected speed limit, there is an effect that a degree of information transfer may be increased.

BRIEF DESCRIPTION OF DRAWINGS

FIG. 3 is a hardware configuration diagram of a computer in a case in which the information display device is implemented by software, firmware or the like.

FIG. 11A is an illustrative view illustrating a display example in a case in which a road is straight, FIG. 11B is an illustrative view illustrating a display example in a case in which a road is curved, and FIG. 11C is an illustrative view illustrating a display example in a case in which a road is a slope.

DESCRIPTION OF EMBODIMENTS

A mode for carrying out the present invention is hereinafter described with reference to attached drawings in order to describe the present invention in more detail.

First Embodiment

Figure 1:
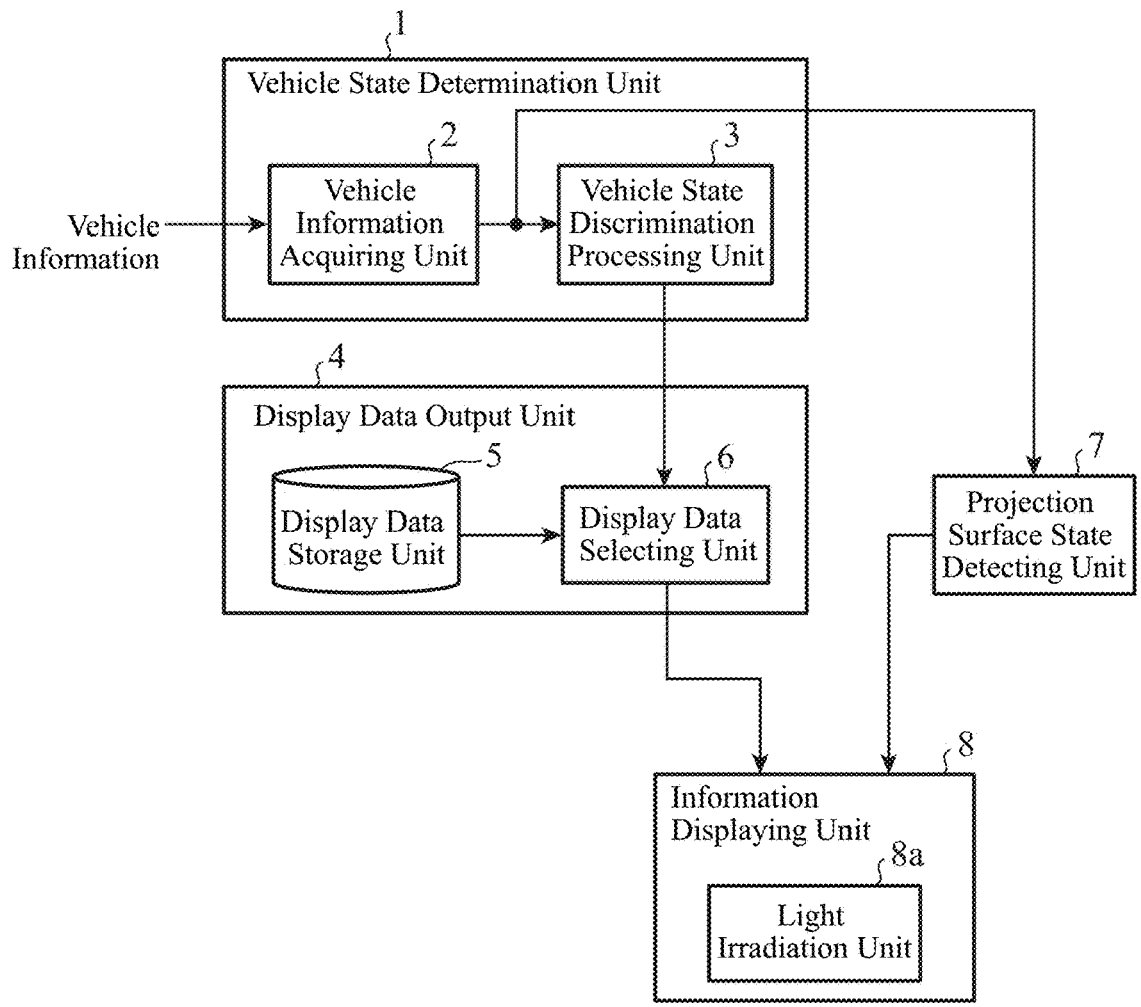
FIG. 1 is a configuration diagram illustrating an information display device according to a first embodiment of the present invention.
Figure 2:
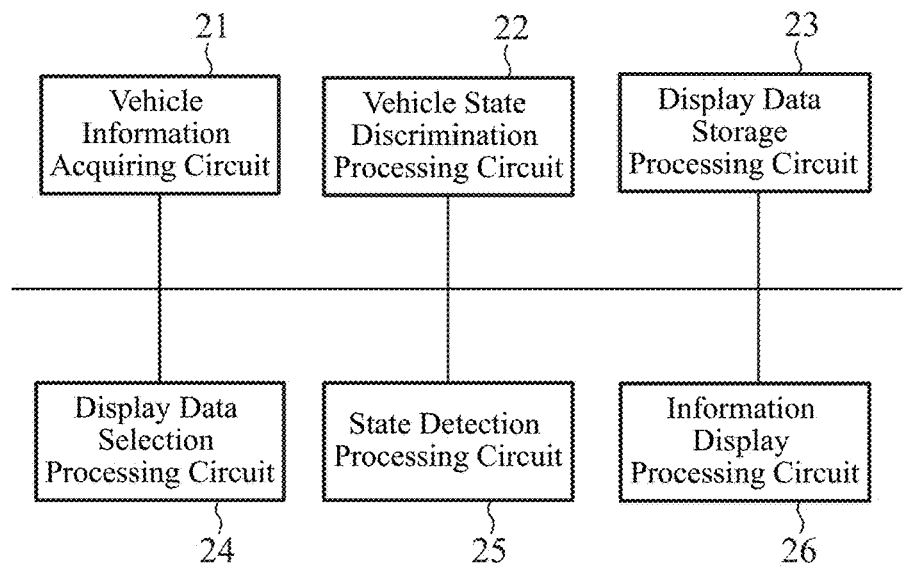
FIG. 2 is a hardware configuration diagram of the information display device according to the first embodiment of the present invention.

FIG. 1 is a configuration diagram illustrating an information display device according to a first embodiment of the present invention, and FIG. 2 is a hardware configuration diagram of the information display device according to the first embodiment of the present invention.

In FIGS. 1 and 2, a vehicle state determination unit 1 includes a vehicle information acquiring unit 2 and a vehicle state determination processing unit 3 and performs processing of determining a state of a vehicle.

The vehicle information acquiring unit 2 is implemented by a vehicle information acquiring circuit 21 provided with an interface device for an in-vehicle network such as a controller area network (CAN), for example, and performs processing of acquiring vehicle information indicating the state of the vehicle from an in-vehicle device through the in-vehicle network.

The vehicle information may include, for example, in addition to CAN data including operation information of a blinker, a steering wheel, an accelerator, a brake, and a shift lever, information output from a car navigation device, information output from a contact sensor mounted on the vehicle, visual information of a camera which takes a photograph of the surroundings of the vehicle and the like.

The information output from the car navigation device may include position information indicating a position of the vehicle, map information, route guidance information indicating a route to a destination of the vehicle and the like.

Also, the information output from the contact sensor may include, for example, operation detection information and the like in a case in which operation within a range of play is performed on the steering wheel, the accelerator, and the brake.

The vehicle state determination processing unit 3 implemented by a vehicle state determination processing circuit 22 in FIG. 2, for example, performs processing of determining the state of the vehicle from the vehicle information acquired by the vehicle information acquiring unit 2.

A display data output unit 4 includes a display data storage unit 5 and a display data selecting unit 6 and performs processing of outputting display data for displaying information indicating the state of the vehicle determined by the vehicle state determination processing unit 3.

The display data storage unit 5 implemented by a display data storage processing circuit 23 in FIG. 2, for example, stores the display data for displaying information to be presented to the outside the vehicle for each state of the vehicle. The display data stored in the display data storage unit 5 is, for example, animated display data including information to be presented to the outside of the vehicle.

The display data selecting unit 6 implemented by a display data selection processing circuit 24 in FIG. 2 performs processing of selecting the display data corresponding to the state of the vehicle determined by the vehicle state determination processing unit 3 out of a plurality of pieces of display data stored in the display data storage unit 5.

A projection surface state detecting unit 7 implemented by, for example, a state detection processing circuit 25 in FIG. 2 performs processing of detecting a state of a projection surface outside the vehicle as an environment of the vehicle.

An information displaying unit 8 implemented by an information display processing circuit 26 in FIG. 2, for example, performs processing of displaying information to the outside of the vehicle in accordance with the display data output from the display data output unit 4.

That is, the information displaying unit 8 includes a light irradiation unit 8a which displays the information indicating the state of the vehicle on the projection surface by irradiating the projection surface outside the vehicle with, for example, laser light or light emitting diode (LED) light in accordance with the display data output from the display data output unit 4.

The light irradiation unit 8a of the information displaying unit 8 switches an angle or brightness of the light irradiated to the projection surface in accordance with the state detected by the projection surface state detecting unit 7.

The surface on which the light is projected may include a road surface around the vehicle, a body of the vehicle, a window of the vehicle and the like, and the body and the window of the vehicle are included as the projection surface outside the vehicle.

An example in which a medium on which the information is displayed in the information displaying unit 8 is the road surface around the vehicle, the body and the window of the vehicle is herein described; however, for example, the information displaying unit 8 may display the information on a display tool and a display by using the display tool formed of a plurality of light emitting devices attached in a lighting tool such as a headlight and a stop light, the body of the vehicle and the like, the display attached to the body of the vehicle and the like as a display medium.

FIG. 23 is an illustrative view illustrating an example of a medium on which information is displayed in the information displaying unit 8.

Figure 23A:
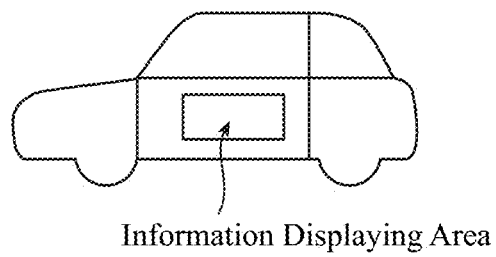
FIG. 23A is an illustrative view illustrating an example in which a medium on which information is displayed is a body of the vehicle.
Figure 23B:
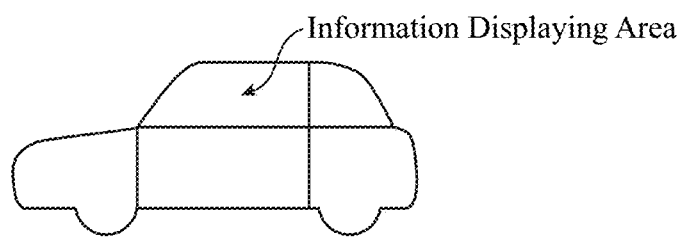
FIG. 23B is an illustrative view illustrating an example in which the medium on which information is displayed is a window of the vehicle.
Figure 23C:
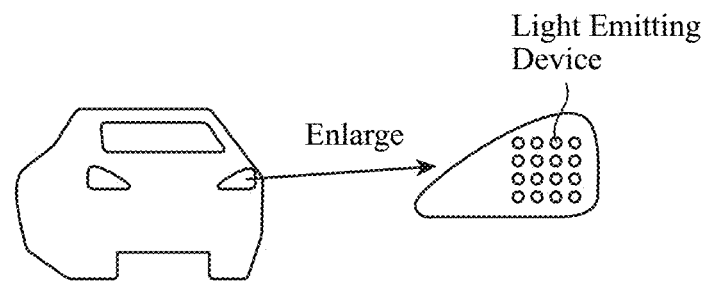
FIG. 23C is an illustrative view illustrating an example in which the medium on which information is displayed is a display tool formed of a plurality of light emitting devices.
Figure 23D:
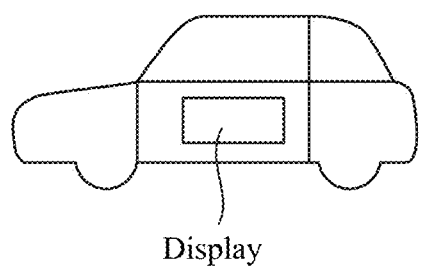
FIG. 23D is an illustrative view illustrating an example in which the medium on which information is displayed is a display attached to the body of the vehicle.

FIG. 23A illustrates an example in which the medium on which information is displayed is the body of the vehicle, FIG. 23B illustrates an example in which the medium on which information is displayed is the window of the vehicle, FIG. 23C illustrates an example in which the medium on which information is displayed is the display tool formed of a plurality of light emitting devices, and FIG. 23D illustrates an example in which the medium on which information is displayed is the display attached to the body of the vehicle.

In FIG. 1, it is supposed that the vehicle information acquiring unit 2, the vehicle state determination processing unit 3, the display data storage unit 5, the display data selecting unit 6, the projection surface state detecting unit 7, and the information displaying unit 8 which are components of the information display device are implemented by dedicated hardware illustrated in FIG. 2, that is, the vehicle information acquiring circuit 21, the vehicle state determination processing circuit 22, the display data storage processing circuit 23, the display data selection processing circuit 24, the state detection processing circuit 25, and the information display processing circuit 26, respectively.

Herein, the display data storage processing circuit 23 corresponds to, for example, a non-volatile or volatile semiconductor memory such as a random access memory (RAM), a read only memory (ROM), a flash memory, an erasable programmable read only memory (EPROM), and an electrically erasable programmable read only memory (EEPROM), a magnetic disk, a flexible disk, an optical disk, a compact disk, a mini disk, a digital versatile disk (DVD) and the like.

Also, each of the vehicle information acquiring circuit 21, the vehicle state determination processing circuit 22, the display data selection processing circuit 24, the state detection processing circuit 25, and the information display processing circuit 26 corresponds to, for example, a single circuit, a composite circuit, a programmed processor, a parallel-programmed processor, an application specific integrated circuit (ASIC), a field-programmable gate array (FPGA), or a combination thereof.

Also, the components of the information display device are not limited to those implemented by the dedicated hardware, and the information display device may also be implemented by software, firmware, or a combination of the software and firmware.

The software and firmware are stored as a program in a memory of a computer. The computer is intended to mean the hardware which executes the program, and corresponds to, for example, a central processing unit (CPU), a central processor, a processing unit, an arithmetic unit, a microprocessor, a microcomputer, a processor, a digital signal processor (DSP) and the like.

Figure 3:
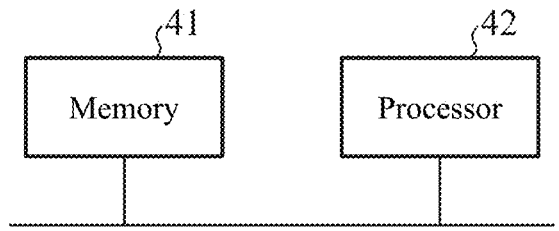

FIG. 3 is a hardware configuration diagram of the computer in a case in which the information display device is implemented by the software, firmware and the like.

In a case in which the information display device is implemented by the software, firmware and the like, the display data storage unit 5 may be configured on a memory 41 of the computer and a program for allowing the computer to execute procedures of the vehicle information acquiring unit 2, the vehicle state determination processing unit 3, the display data selecting unit 6, the projection surface state detecting unit 7, and the information displaying unit 8 may be stored in the memory 41, and a processor 42 of the computer may execute the program stored in the memory 41.

Figure 4:
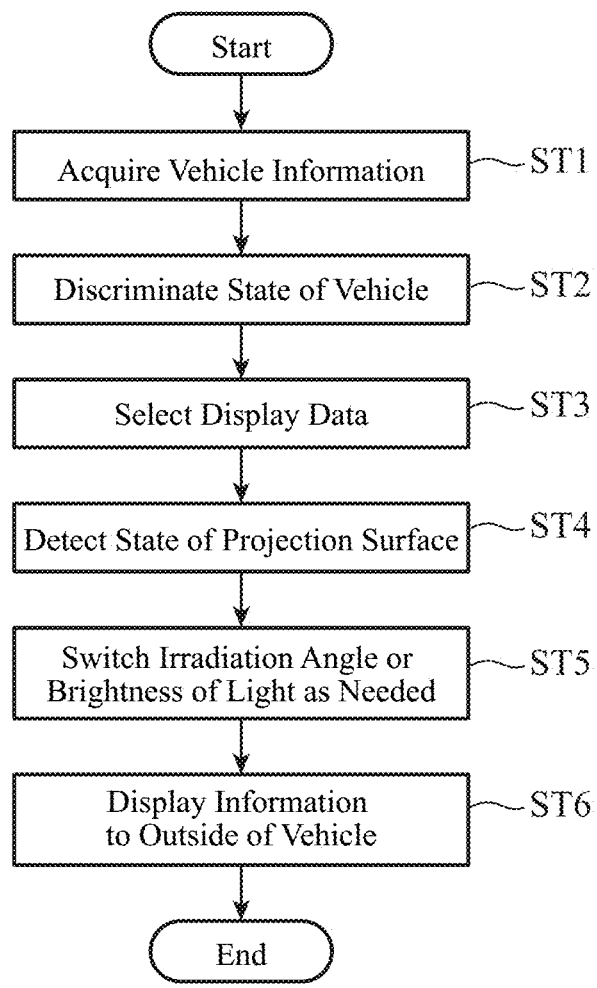
FIG. 4 is a flowchart illustrating an information display method being a procedure of the information display device according to the first embodiment of the present invention.

FIG. 4 is a flowchart illustrating an information display method which is the procedure of the information display device according to the first embodiment of the present invention.

Also, FIG. 2 illustrates an example in which each of the components of the information display device is implemented by dedicated hardware, and FIG. 3 illustrates an example in which the information display device is implemented by the software, firmware and the like; however, some components in the information display device may be implemented by the dedicated hardware and remaining components may be implemented by the software, firmware and the like.

For example, the vehicle information acquiring unit 2 and the information displaying unit 8 may be implemented by the dedicated hardware, and the vehicle state determination processing unit 3, the display data storage unit 5, the display data selecting unit 6, and the projection surface state detecting unit 7 may be implemented by the software, firmware and the like. A combination of the dedicated hardware, software and the like is freely selected.

Next, operations will be described.

The vehicle information acquiring unit 2 of the vehicle state determination unit 1 acquires the vehicle information indicating the state of the vehicle from the in-vehicle device through the in-vehicle network, and outputs the vehicle information to the vehicle state determination processing unit 3 (step ST1 in FIG. 4).

In the first embodiment, as the vehicle information, the information output from the car navigation device, the information output from the contact sensor mounted on the vehicle, the visual information of the camera which takes a photograph of the surroundings of the vehicle are acquired, for example, in addition to the CAN data.

Upon receiving the vehicle information from the vehicle information acquiring unit 2, the vehicle state determination processing unit 3 determines the state of the vehicle from the vehicle information (step ST2).

The state of the vehicle may include, for example, a traveling speed of the vehicle, whether a traveling direction of the vehicle is curved, a state of being parked in a garage, and the like.

The traveling speed of the vehicle may be determined from speed information of the vehicle included in the CAN data.

Also, it is possible to discriminate whether the traveling direction of the vehicle is curved from the operation information of the steering wheel included in the CAN data.

In addition, the state of being parked in the garage may be determined from the operation information of the shift lever and the operation information of the steering wheel included in the CAN data. That is, when a position of the shift lever is a "reverse position" and an operational angle of the steering wheel is equal to or larger than a predetermined angle, it may be determined that the vehicle is in the state of being parked in the garage.

Although an example of determining the traveling speed of the vehicle, whether the traveling direction of the vehicle is curved, the state of being parked in the garage, and the like as the state of the vehicle is herein described, this is merely an example, and it goes without saying that other vehicle states may also be determined.

The display data storage unit 5 of the display data output unit 4 stores the display data for displaying the information to be presented to the outside the vehicle is stored for each state of the vehicle.

The display data is, for example, the animated display data including the information to be presented to the outside the vehicle. The animated display data is, for example, data of a moving image pattern by which directionality, that is, the traveling direction of a vehicle is transmitted, such as a pattern and an arrow conforming to general road rules.

Also, the information to be presented to the outside of the vehicle may include, for example, information indicating the traveling direction of the vehicle, a traveling mode of the vehicle and the like, but any information may be used as long as this contributes to driving safety.

Incidentally, the traveling mode of the vehicle may include manual travel, automated travel, formation travel and the like.

The display data selecting unit 6 of the display data output unit 4 selects the display data corresponding to the state of the vehicle determined by the vehicle state determination processing unit 3 out of a plurality of pieces of display data stored in the display data storage unit 5, and outputs the display data to the information displaying unit 8 (step ST3).

The projection surface state detecting unit 7 detects the state of the projection surface outside the vehicle as the environment of the vehicle (step ST4).

For example, the projection surface state detecting unit 7 detects a state of unevenness of the road surface from the visual information of the camera which takes a photograph of the surroundings of the vehicle out of the vehicle information acquired by the vehicle information acquiring unit 2.

The projection surface state detecting unit 7 also detects presence or absence of a puddle from the visual information of the camera as the state of the projection surface.

Since processing of detecting the state of unevenness of the road surface and the presence or absence of a puddle from the visual information of the camera is a well-known technology, the detailed description thereof is omitted.

When the projection surface state detecting unit 7 detects the state of the projection surface, the information displaying unit 8 determines the necessity of switching the angle or the brightness of the light to be irradiated to the projection surface from a detection result of the state, and the light irradiation unit 8a switches the angle or the brightness of the light irradiated to the projection surface in accordance with the determination of the information displaying unit 8 (step ST5).

Thereafter, the information displaying unit 8 displays the information to the outside of the vehicle in accordance with the display data output from the display data output unit 4 (step ST6).

That is, the light irradiation unit 8a of the information displaying unit 8 displays the information indicating the state of the vehicle on the projection surface by irradiating the projection surface outside the vehicle with the laser light or the LED light, for example, in accordance with the display data output from the display data output unit 4.

Hereinafter, a specific example of angle or brightness switching processing is described.

With reference to the detection result of the projection surface state detecting unit 7, the information displaying unit 8 confirms the state of unevenness of the road surface to be irradiated with light in a case in which light is irradiated at an irradiation angle set in advance.

When a degree of the unevenness of the road surface is equal to or higher than a predetermined threshold, the information displaying unit 8 determines that irregular reflection of the light is large and that it is difficult to correctly display the information, and searches for the road surface with a degree of unevenness that is less than a predetermined threshold.

The information displaying unit 8 changes the irradiation angle of the light irradiation unit 8a such that the road surface with the degree of unevenness that is less than a predetermined threshold is irradiated with light.

In a case in which there is no road surface with a degree of unevenness that is less than a predetermined threshold, the information displaying unit 8 decreases the brightness of the light irradiated by the light irradiation unit 8a in order to suppress the irregular reflection of the light. Alternatively, the surface on which the light is projected is changed from the road surface to the body or window of the vehicle.

The information displaying unit 8 also confirms the presence or absence of the puddle on the road surface to be irradiated with the light in a case in which light is irradiated at the irradiation angle set in advance with reference to the detection result of the projection surface state detecting unit 7.

In a case in which there is the puddle on the road surface, the information displaying unit 8 determines that the irregular reflection of the light is large and that it is difficult to correctly display the information, and searches for the road surface without the puddle.

The information displaying unit 8 changes the irradiation angle of the light irradiation unit 8a such that a road surface without a puddle is irradiated with the light.

In a case in which there is no road surface without a puddle, the information displaying unit 8 decreases the brightness of the light irradiated by the light irradiation unit 8a in order to suppress the irregular reflection of the light. Alternatively, the surface on which the light is projected is changed from the road surface to the body or window of the vehicle. Alternatively, a type of the irradiated light is changed from the laser light to the LED light such that the LED light is irradiated.

It is known that the LED light is safer than the laser light even when the LED light enters an eye of a pedestrian, a passenger of a vehicle and the like as a result of the irregular reflection of the light.

Although an example in which the light irradiation unit 8a irradiates the road surface around the vehicle, the body or the window of the vehicle with the light is herein described, it is also possible to display the information by using the display tool formed of a plurality of light emitting devices attached in the lighting tool such as the head light and the stop light, the body of the vehicle and the like, and the display attached to the body of the vehicle as the display medium.

As is clear from the above description, according to the first embodiment, the vehicle state determination unit 1 for determining the state of the vehicle, the display data output unit 4 for outputting the display data for displaying the information indicating the state of the vehicle determined by the vehicle state determination unit 1, and the information displaying unit 8 which displays the information to the outside of the vehicle in accordance with the display data output from the display data output unit 4 are provided, and the information displaying unit 8 is configured to switch the information display method in accordance with the environment of the vehicle, so that an effect of increasing a degree of information transmission can be achieved.

Second Embodiment

In the above-described first embodiment, it is described that the projection surface state detecting unit 7 detects the state of the projection surface outside the vehicle as the environment of the vehicle, but in a second embodiment, it is described that an obstacle around a vehicle is detected as an environment of the vehicle.

Figure 5:
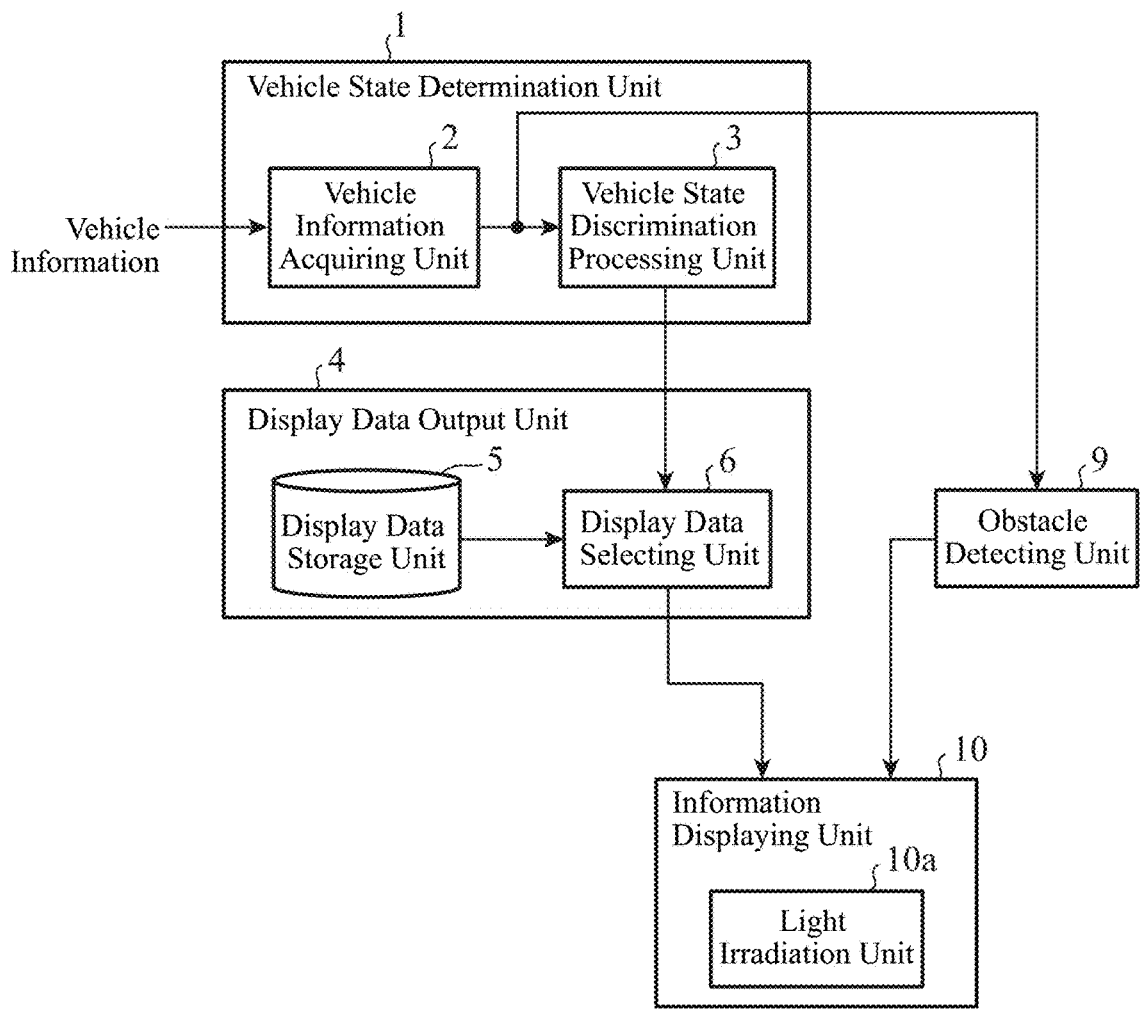
FIG. 5 is a configuration diagram illustrating an information display device according to a second embodiment of the present invention.
Figure 6:
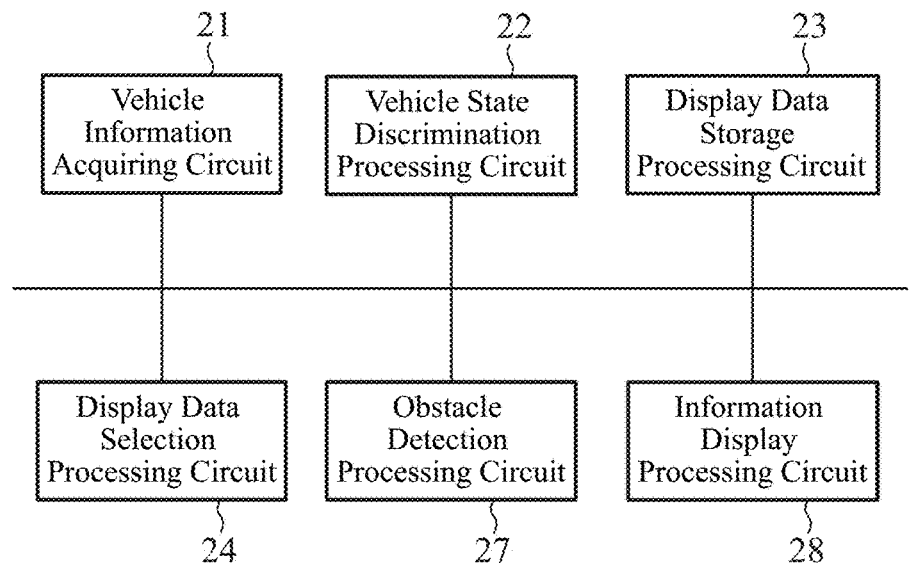
FIG. 6 is a hardware configuration diagram of the information display device according to the second embodiment of the present invention.

FIG. 5 is a configuration diagram illustrating an information display device according to the second embodiment of the present invention, and FIG. 6 is a hardware configuration diagram of the information display device according to the second embodiment of the present invention.

In FIGS. 5 and 6, the same reference signs as those in FIGS. 1 and 2 represent the same or corresponding parts, so that the description thereof is omitted.

An obstacle detecting unit 9 implemented by, for example, an obstacle detection processing circuit 27 in FIG. 6 formed of a semiconductor integrated circuit on which a CPU is mounted, a one-chip microcomputer or the like, performs processing of detecting an obstacle around the vehicle as the environment of the vehicle.

An information displaying unit 10 implemented by an information display processing circuit 28 in FIG. 6, for example, performs processing of displaying information to the outside of the vehicle in accordance with display data output from a display data output unit 4.

That is, the information displaying unit 10 includes a light irradiation unit 10a which displays information indicating a state of the vehicle on a projection surface by irradiating the projection surface outside the vehicle with, for example, laser light or LED light in accordance with the display data output from the display data output unit 4.

The light irradiation unit 10a of the information displaying unit 10 switches the projection surface in accordance with an obstacle detection result of the obstacle detecting unit 9.

In FIG. 5, a vehicle information acquiring unit 2, a vehicle state determination processing unit 3, a display data storage unit 5, a display data selecting unit 6, the obstacle detecting unit 9, and the information displaying unit 10 being components of the information display device are assumed to be implemented by dedicated hardware as illustrated in FIG. 6, that is, a vehicle information acquiring circuit 21, a vehicle state determination processing circuit 22, a display data storage processing circuit 23, a display data selection processing circuit 24, the obstacle detection processing circuit 27, and the information display processing circuit 28, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 5 may be configured on the memory 41 of the computer illustrated in FIG. 3 and a program for allowing the computer to execute procedures of the vehicle information acquiring unit 2, the vehicle state determination processing unit 3, the display data selecting unit 6, the obstacle detecting unit 9, and the information displaying unit 10 may be stored in the memory 41, and the processor 42 may execute the program stored in the memory 41.

Operation is next described.

However, the components other than the obstacle detecting unit 9 and the information displaying unit 10 are similar to those in the above-described first embodiment, so that processing content of the obstacle detecting unit 9 and the information displaying unit 10 is herein described.

The obstacle detecting unit 9 detects the obstacle around the vehicle as the environment of the vehicle.

For example, the obstacle detecting unit 9 detects the obstacle around the vehicle from visual information of a camera which takes a photograph of the surroundings of the vehicle out of vehicle information acquired by the vehicle information acquiring unit 2.

Since processing of detecting the obstacle from the visual information of the camera is a well-known technology, the detailed description thereof is omitted.

The light irradiation unit 10a of the information displaying unit 10 switches the projection surface in accordance with an obstacle detection result of the obstacle detecting unit 9.

Thereafter, the information displaying unit 10 displays the information to the outside of the vehicle in accordance with the display data output from the display data output unit 4.

That is, the light irradiation unit 10a of the information displaying unit 10 displays the information indicating the state of the vehicle on the projection surface by irradiating the projection surface outside the vehicle with the laser light or the LED light, for example, in accordance with the display data output from the display data output unit 4.

Herein, FIG. 7 is an illustrative view illustrating a display example of the information by the information displaying unit 10.

Figure 7A:
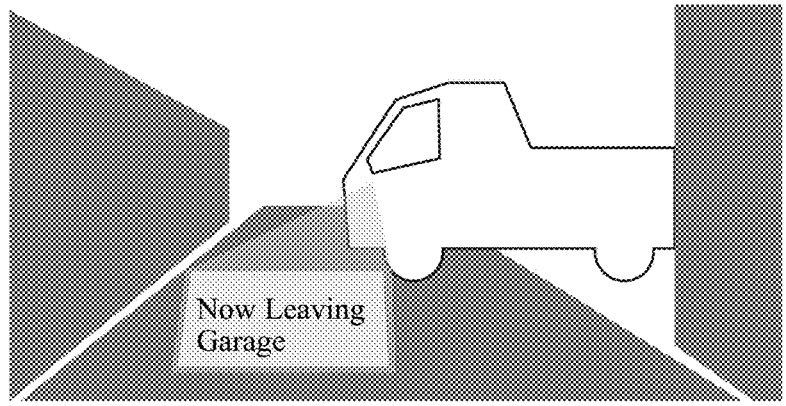
FIG. 7A is an illustrative view illustrating an example in which a space in front of a vehicle is irradiated with light because there is a sufficient space for displaying information in front of the vehicle.
Figure 7B:
FIG. 7B is an illustrative view illustrating an example in which there is no sufficient space for displaying the information in front of the vehicle, so that a surface on which the light is projected is switched from a road surface in front of the vehicle to a wall surface in front of the vehicle.

FIG. 7A illustrates an example in which a space in front of the vehicle is irradiated with the light because there is a sufficient space for displaying the information in front of the vehicle, and FIG. 7B illustrates an example in which there is no sufficient space for displaying the information in front of the vehicle, so that the surface on which the light is projected is switched from a road surface in front of the vehicle to a wall surface in front of the vehicle.

FIG. 7 illustrates an example of displaying the information indicating the state of the vehicle "now leaving garage".

In FIG. 7, since the state of the vehicle is a state of leaving a garage, the display data selecting unit 6 selects the display data corresponding to the state of leaving the garage. It is assumed that this display data includes information indicating that display is made on the road surface in front of the vehicle as the original information indicating a position where display is made.

Therefore, the obstacle detecting unit 9 performs the processing of detecting the obstacle present in front of the vehicle, and in the example in FIG. 7A, since there is the sufficient space in front of the vehicle, no obstacle is detected. On the other hand, in the example in FIG. 7B, since there is no sufficient space in front of the vehicle, the wall surface in front of the vehicle is detected as the obstacle.

Since the obstacle is not detected by the obstacle detecting unit 9 in the case in FIG. 7A, the light irradiation unit 10a of the information displaying unit 10 irradiates the road surface in front of the vehicle, which is indicated by the original information as a display position, with the light, thereby displaying the information on the road surface in front of the vehicle.

Since the obstacle is detected by the obstacle detecting unit 9 in the case of FIG. 7B, the information displaying unit 10 switches the surface on which the light is projected from the road surface in front of the vehicle to the wall surface in front of the vehicle, and the light irradiation unit 10a irradiates the wall surface in front of the vehicle with the light, thereby displaying the information on the wall surface in front of the vehicle.

Meanwhile, the obstacle detecting unit 9 has a function of searching for a flat surface usable as the projection surface around the vehicle in a case of detecting the obstacle. In this example, the wall surface in front of the vehicle is searched for as the flat surface usable as the projection surface.

Since processing of searching for the flat surface usable as the projection surface is a known technology, the detailed description thereof is omitted.

As is clear from the above description, according to the second embodiment, the obstacle detecting unit 9 which detects the obstacle around the vehicle as the environment of the vehicle is provided, and the information displaying unit 10 is configured to switch the projection surface in accordance with the obstacle detection result of the obstacle detecting unit 9, so that there is an effect of increasing a degree of information transmission as in the above-described first embodiment.

Figure 8:
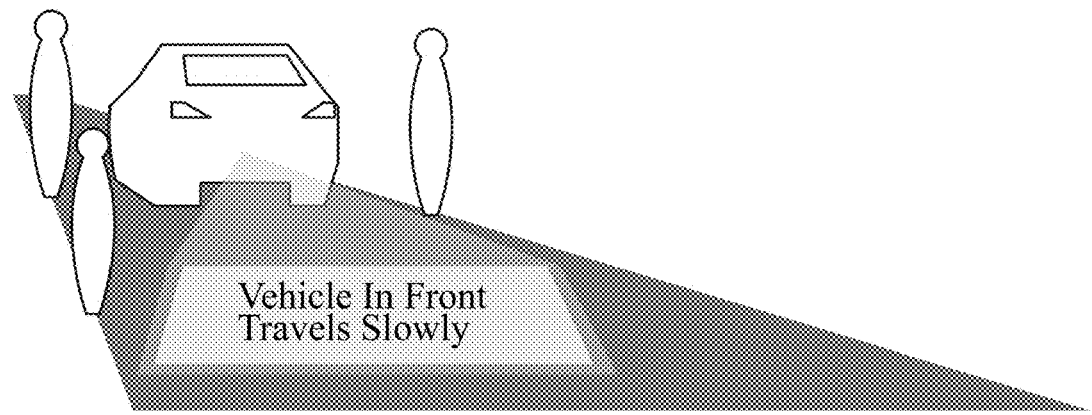
FIG. 8 is an illustrative view illustrating an example in which a pedestrian is detected as an obstacle by an obstacle detecting unit 9, so that a surface on which the light is projected is switched to a road surface on which no pedestrian is present.

Although the example in which the information displaying unit 10 switches the surface on which the light is projected from the road surface in front of the vehicle to the wall surface in front of the vehicle is described in the second embodiment, when the obstacle detected by the obstacle detecting unit 9 is a pedestrian, the information may also be displayed on the road surface on which no pedestrian is present as illustrated in FIG. 8.

FIG. 8 is an illustrative view illustrating an example in which the pedestrian is detected as the obstacle by the obstacle detecting unit 9, so that the surface on which the light is projected is switched to the road surface on which no pedestrian is present.

In the example in FIG. 8, the information indicating the state of the vehicle "vehicle in front travels slowly" is displayed.

Third Embodiment

In the above-described first embodiment, the projection surface state detecting unit 7 detects the state of the projection surface outside the vehicle as the environment of the vehicle, but in a third embodiment, as an environment of a vehicle, a shape of a road on which the vehicle travels is detected.

Figure 9:
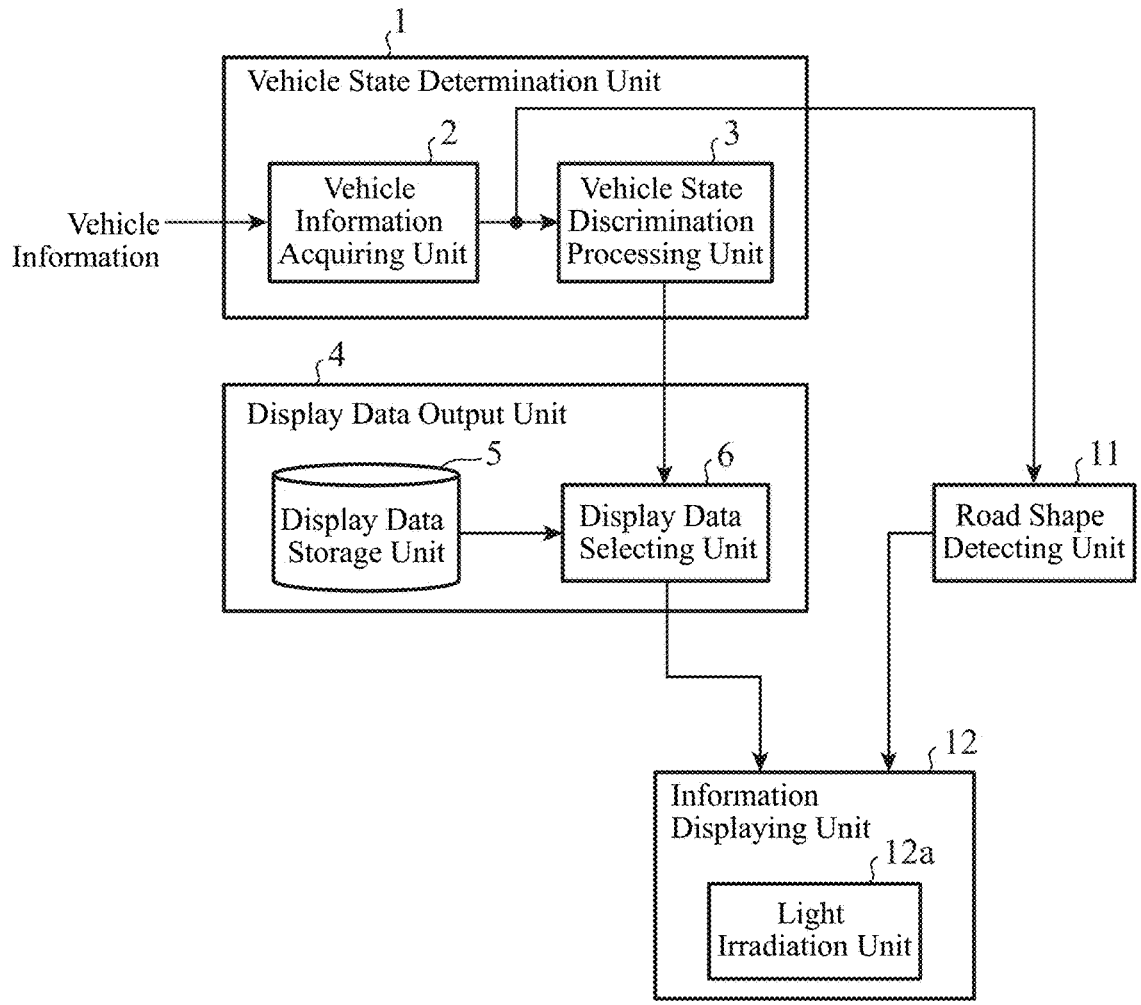
FIG. 9 is a configuration diagram illustrating an information display device according to a third embodiment of the present invention.
Figure 10:
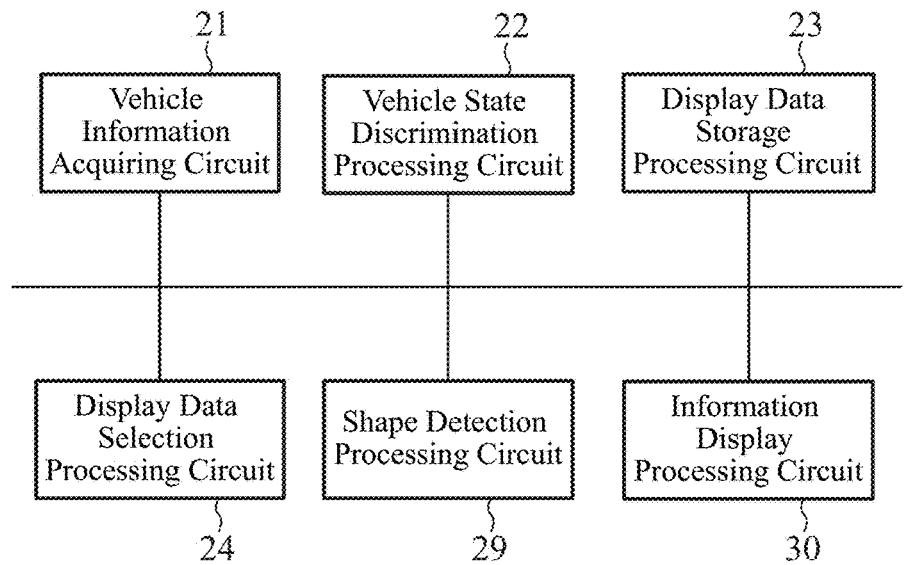
FIG. 10 is a hardware configuration diagram of the information display device according to the third embodiment of the present invention.

FIG. 9 is a configuration diagram illustrating an information display device according to the third embodiment of the present invention, and FIG. 10 is a hardware configuration diagram of the information display device according to the third embodiment of the present invention.

In FIGS. 9 and 10, the same reference signs as those in FIGS. 1 and 2 represent the same or corresponding parts, so that the description thereof is omitted.

A road shape detecting unit 11 implemented by, for example, a shape detection processing circuit 29 in FIG. 10 formed of a semiconductor integrated circuit on which a CPU is mounted, a one-chip microcomputer or the like performs processing of detecting the shape of the road on which the vehicle travels as the environment of the vehicle.

An information displaying unit 12 implemented by an information display processing circuit 30 in FIG. 10, for example, performs processing of displaying information to the outside of the vehicle in accordance with display data output from a display data output unit 4.

That is, the information displaying unit 12 includes a light irradiation unit 12a which displays information indicating a state of the vehicle on a projection surface by irradiating the projection surface outside the vehicle with, for example, laser light or LED light in accordance with the display data output from the display data output unit 4.

The light irradiation unit 12a of the information displaying unit 12 performs processing of controlling irradiation of the light such that a shape based on information to be displayed on the projection surface changes in accordance with the shape of the road detected by the road shape detecting unit 11.

In FIG. 9, a vehicle information acquiring unit 2, a vehicle state determination processing unit 3, a display data storage unit 5, a display data selecting unit 6, the road shape detecting unit 11, and the information displaying unit 12 being components of the information display device are assumed to be implemented by dedicated hardware as illustrated in FIG. 10, that is, a vehicle information acquiring circuit 21, a vehicle state determination processing circuit 22, a display data storage processing circuit 23, a display data selection processing circuit 24, the shape detection processing circuit 29, and the information display processing circuit 30, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 5 may be configured on the memory 41 of the computer illustrated in FIG. 3 and a program for allowing the computer to execute procedures of the vehicle information acquiring unit 2, the vehicle state determination processing unit 3, the display data selecting unit 6, the road shape detecting unit 11, and the information displaying unit 12 may be stored in the memory 41, and the processor 42 may execute the program stored in the memory 41.

Operation is next described.

However, the components other than the road shape detecting unit 11 and the information displaying unit 12 are similar to those in the above-described first embodiment, so that processing content of the road shape detecting unit 11 and the information displaying unit 12 is herein described.

The road shape detecting unit 11 detects the shape of the road on which the vehicle travels as the environment of the vehicle.

For example, the road shape detecting unit 11 detects the shape of the road on which the vehicle travels from information output from a car navigation device, that is, position information indicating a position of the vehicle and map information out of vehicle information acquired by the vehicle information acquiring unit 2.

Since processing of detecting the road shape is a well-known technology, the detailed description thereof is omitted.

The information displaying unit 12 displays the information to the outside of the vehicle in accordance with the display data output from the display data output unit 4.

That is, the light irradiation unit 12a of the information displaying unit 12 displays the information indicating the state of the vehicle on the projection surface by irradiating the projection surface outside the vehicle with the laser light or the LED light, for example, in accordance with the display data output from the display data output unit 4.

At that time, the light irradiation unit 12a of the information displaying unit 12 controls the irradiation of the light such that a shape based on information to be displayed on the projection surface changes in accordance with the shape of the road detected by the road shape detecting unit 11.

Herein, FIG. 11 is an illustrative view illustrating a display example of the information by the information displaying unit 12.

FIG. 11A illustrates the display example in a case in which the road is straight, FIG. 11B illustrates the display example in a case in which the road is curved, and FIG. 11C illustrates the display example in a case in which the road is a slope. In FIG. 11, for the sake of simplicity of description, an example in which the information to be presented is a triangular symbol is illustrated.

In a case in which the road is straight, the light irradiation unit 12a of the information displaying unit 12 irradiates a road surface behind a user's vehicle with the light without changing the shape based on the information indicated by the display data, thereby displaying the information on the road surface behind the user's vehicle as illustrated in FIG. 11A.

In a case in which the road is curved, the light irradiation unit 12a of the information displaying unit 12 changes the shape based on the information indicated by the display data in accordance with the curve of the road and irradiates the road surface in a direction corresponding to the curve of the road with the light, thereby displaying the information on the road surface behind the user's vehicle as illustrated in FIG. 11B.

In a case in which the road is the slope, the light irradiation unit 12a of the information displaying unit 12 changes the shape based on the information indicated by the display data in accordance with the shape of the slope and displays the information on the road surface behind the user's vehicle, thereby displaying the information on the road surface behind the user's vehicle as illustrated in FIG. 11C.

Processing of changing the shape based on the information indicated by the display data in accordance with the shape of the road is a well-known technology, so that the detailed description thereof is omitted.

As is clear from the above description, according to the third embodiment, the road shape detecting unit 11 which detects the shape of the road on which the vehicle travels as the environment of the vehicle is provided, and the information displaying unit 12 controls the irradiation of the light such that the shape based on the information to be displayed on the projection surface changes in accordance with the shape of the road detected by the road shape detecting unit 11, so that there is an effect of increasing a degree of information transmission as in the above-described first embodiment.

Fourth Embodiment

Although the projection surface state detecting unit 7 detects the state of the projection surface outside the vehicle as the environment of the vehicle in the above-described first embodiment, in a fourth embodiment, as an environment of a vehicle, a speed limit of a road on which the vehicle travels is detected.

Figure 12:
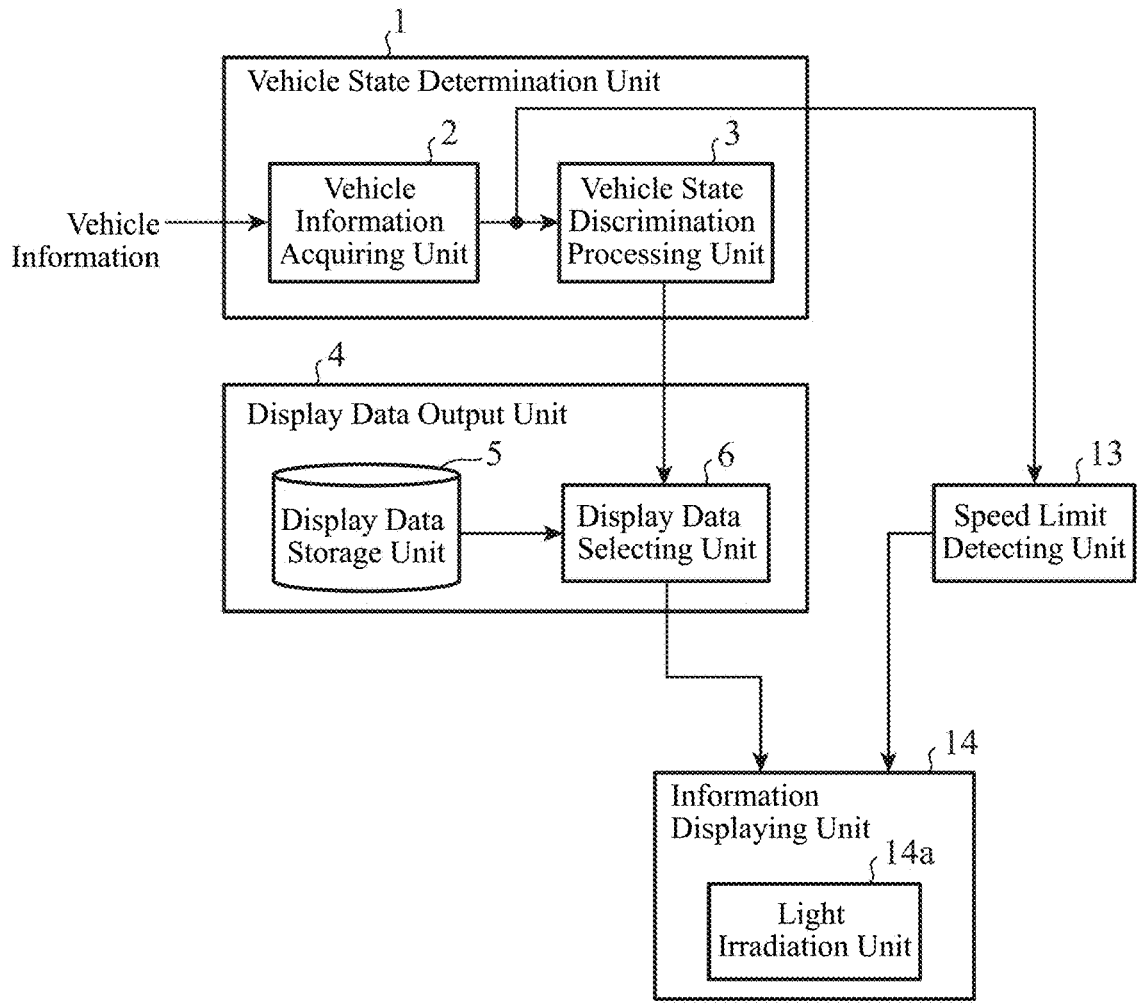
FIG. 12 is a configuration diagram illustrating an information display device according to a fourth embodiment of the present invention.
Figure 13:
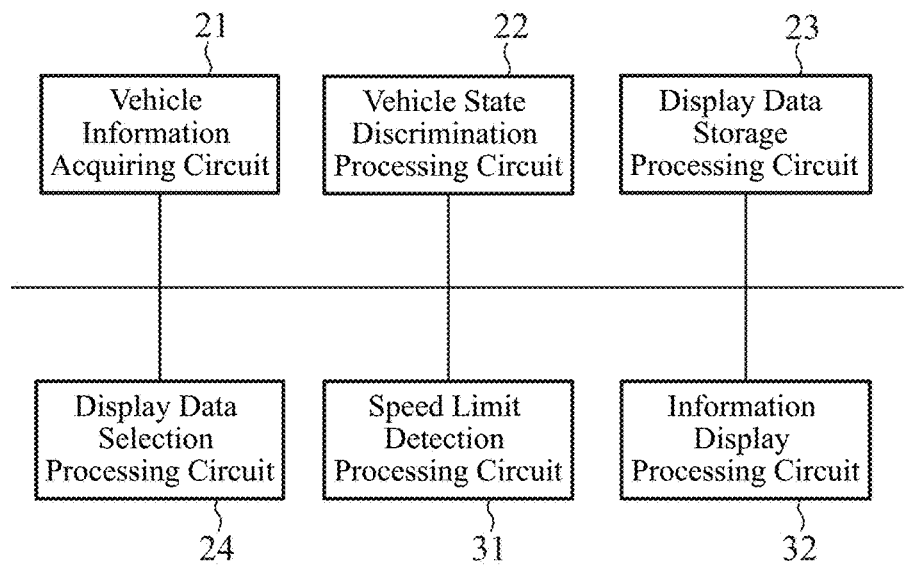
FIG. 13 is a hardware configuration diagram of the information display device according to the fourth embodiment of the present invention.

FIG. 12 is a configuration diagram illustrating an information display device according to the fourth embodiment of the present invention, and FIG. 13 is a hardware configuration diagram of the information display device according to the fourth embodiment of the present invention.

In FIGS. 12 and 13, the same reference signs as those in FIGS. 1 and 2 represent the same or corresponding parts, so that the description thereof is omitted.

A speed limit detecting unit 13 implemented by a speed limit detection processing circuit 31 in FIG. 13 formed of, for example, a semiconductor integrated circuit on which a CPU is mounted, a one-chip microcomputer or the like performs processing of detecting the speed limit of the road on which the vehicle travels as the environment of the vehicle.

An information displaying unit 14 implemented by an information display processing circuit 32 in FIG. 13, for example, performs processing of displaying information to the outside of the vehicle in accordance with display data output from a display data output unit 4.

That is, the information displaying unit 14 includes a light irradiation unit 14a which displays information indicating a state of the vehicle on a projection surface by irradiating the projection surface outside the vehicle with, for example, laser light or LED light in accordance with the display data output from the display data output unit 4.

The light irradiation unit 14a of the information displaying unit 14 switches an angle of the light irradiated to the projection surface in accordance with the shape of the road detected by the speed limit detecting unit 13.

In FIG. 12, a vehicle information acquiring unit 2, a vehicle state determination processing unit 3, a display data storage unit 5, a display data selecting unit 6, the speed limit detecting unit 13, and the information displaying unit 14 being components of the information display device are assumed to be implemented by dedicated hardware as illustrated in FIG. 13, that is, a vehicle information acquiring circuit 21, a vehicle state determination processing circuit 22, a display data storage processing circuit 23, a display data selection processing circuit 24, the speed limit detection processing circuit 31, and the information display processing circuit 32, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 5 may be configured on the memory 41 of the computer illustrated in FIG. 3 and a program for allowing the computer to execute procedures of the vehicle information acquiring unit 2, the vehicle state determination processing unit 3, the display data selecting unit 6, the speed limit detecting unit 13, and the information displaying unit 14 may be stored in the memory 41, and the processor 42 may execute the program stored in the memory 41.

Operation is next described.

However, the components other than the speed limit detecting unit 13 and the information displaying unit 14 are similar to those of the above-described first embodiment, so that processing content of the speed limit detecting unit 13 and the information displaying unit 14 is herein described.

The speed limit detecting unit 13 detects the speed limit of the road on which the vehicle travels as the environment of the vehicle.

For example, the speed limit detecting unit 13 detects the speed limit of the road on which the vehicle travels from information output from a car navigation device, that is, position information indicating a position of the vehicle and map information out of vehicle information acquired by the vehicle information acquiring unit 2. Generally, the map information includes information indicating the speed limit of the road.

The information displaying unit 14 displays the information to the outside of the vehicle in accordance with the display data output from the display data output unit 4.

That is, the light irradiation unit 14a of the information displaying unit 14 displays the information indicating the state of the vehicle on the projection surface by irradiating the projection surface outside the vehicle with the laser light or the LED light, for example, in accordance with the display data output from the display data output unit 4.

At that time, the light irradiation unit 14*a* of the information displaying unit 14 switches the angle of the light to be irradiated to the projection surface in accordance with the speed limit of the road detected by the speed limit detecting unit 13.

Herein, FIG. 14 is an illustrative view illustrating a display example of the information by the information displaying unit 14.

Figure 14A:
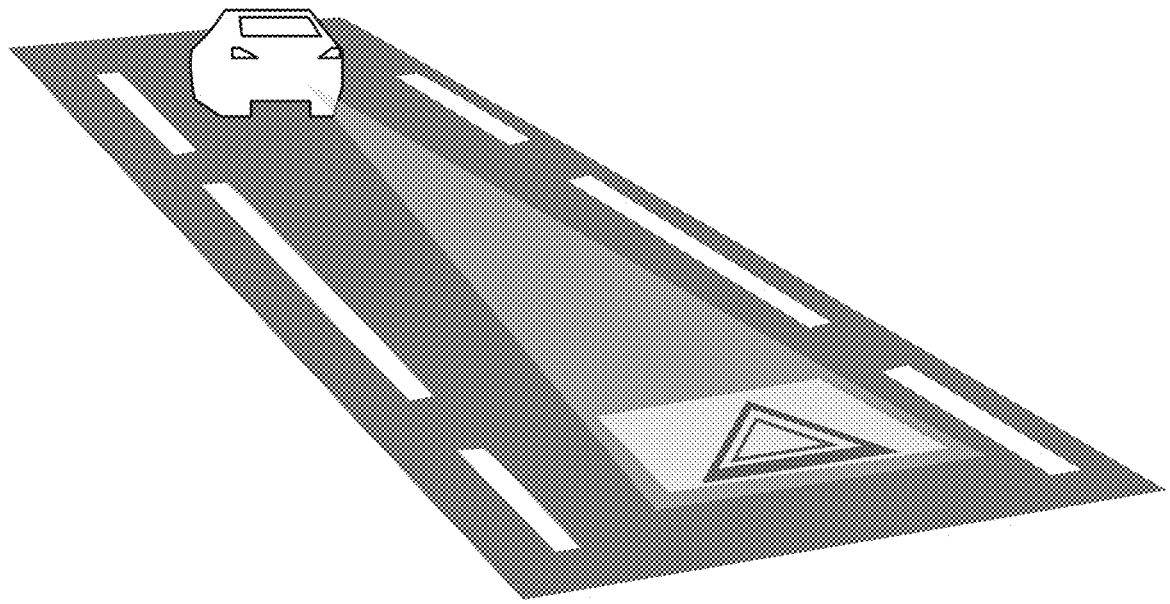
FIG. 14A is an illustrative view illustrating a display example in a case in which a speed limit of the road is high.
Figure 14B:
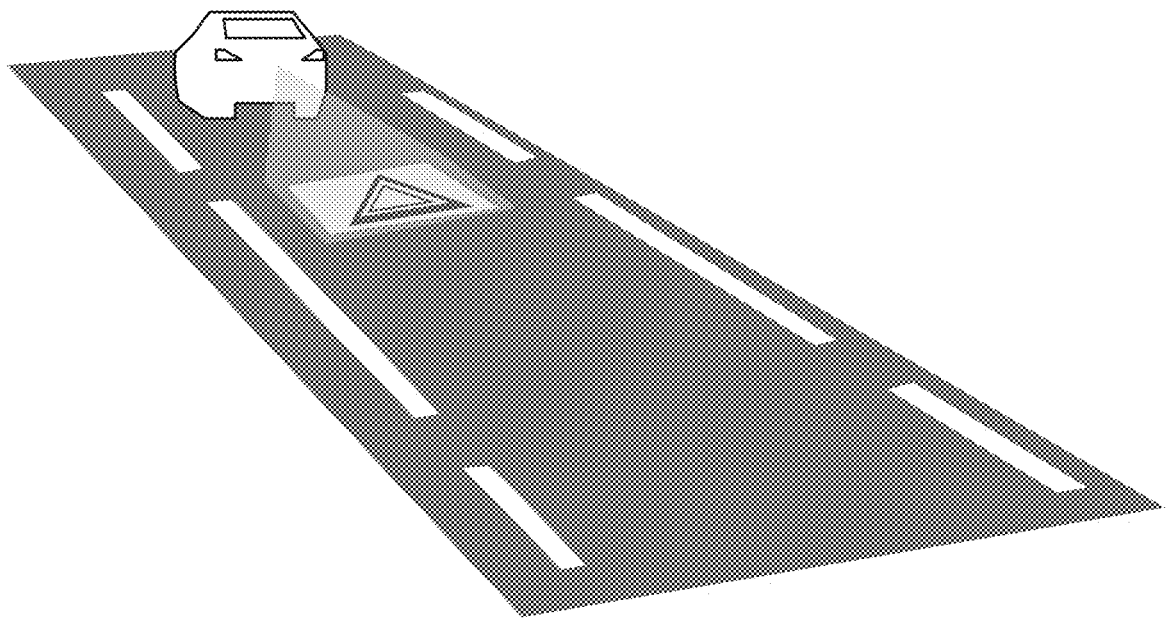
FIG. 14B is an illustrative view illustrating a display example in a case in which the speed limit of the road is low.

FIG. 14A illustrates the display example in a case in which the speed limit of the road is high, and FIG. 14B illustrates the display example in a case in which the speed limit of the road is low. In FIG. 14, for the sake of simplicity of description, an example in which the information to be presented is a triangular symbol is illustrated.

In a case in which the speed limit of the road is high, a speed of a user's vehicle is considered to be high, so that the information displaying unit 14 changes an irradiation angle of the light irradiation unit 14*a* such that a road surface in a position far from the user's vehicle is irradiated with the light such that the other party at a longer distance may easily find the same.

In a case in which the speed limit of the road is low, the speed of the user's vehicle is considered to be low, so that the light irradiation unit 14*a* of the information displaying unit 14 changes the irradiation angle of the light irradiation unit 14*a* such that the road surface in a position closer to the user's vehicle is irradiated with the light. Alternatively, the surface on which the light is projected is changed from the road surface to a body or a window of the vehicle.

As is clear from the above description, according to the fourth embodiment, the speed limit detecting unit 13 which detects the speed limit of the road on which the vehicle travels as the environment of the vehicle is provided, and the information displaying unit 14 is configured to switch the angle of the light irradiated to the projection surface in accordance with the speed limit of the road detected by the speed limit detecting unit 13, so that, there is an effect of increasing a degree of information transmission as in the first embodiment.

In the fourth embodiment, the speed limit detecting unit 13 detects the speed limit of the road on which the vehicle travels as the environment of the vehicle, but the speed of the user's vehicle may also be detected from the vehicle information acquired by the vehicle information acquiring unit 2. In this case, when the speed of the user's vehicle is high, as illustrated in FIG. 14A, the information displaying unit 14 changes the irradiation angle of the light irradiation unit 14*a* so that the road surface in a position far from the user's vehicle is irradiated with the light, and when the speed of the user's vehicle is low, as illustrated in FIG. 14B, this changes the irradiation angle of the light irradiation unit 14*a* so that the road surface in a position closer to the user's vehicle is irradiated with the light.

Fifth Embodiment

In the above-described first embodiment, the projection surface state detecting unit 7 detects the state of the projection surface outside the vehicle as the environment of the vehicle, but in a fifth embodiment, brightness around a vehicle is detected as an environment of the vehicle.

Figure 15:
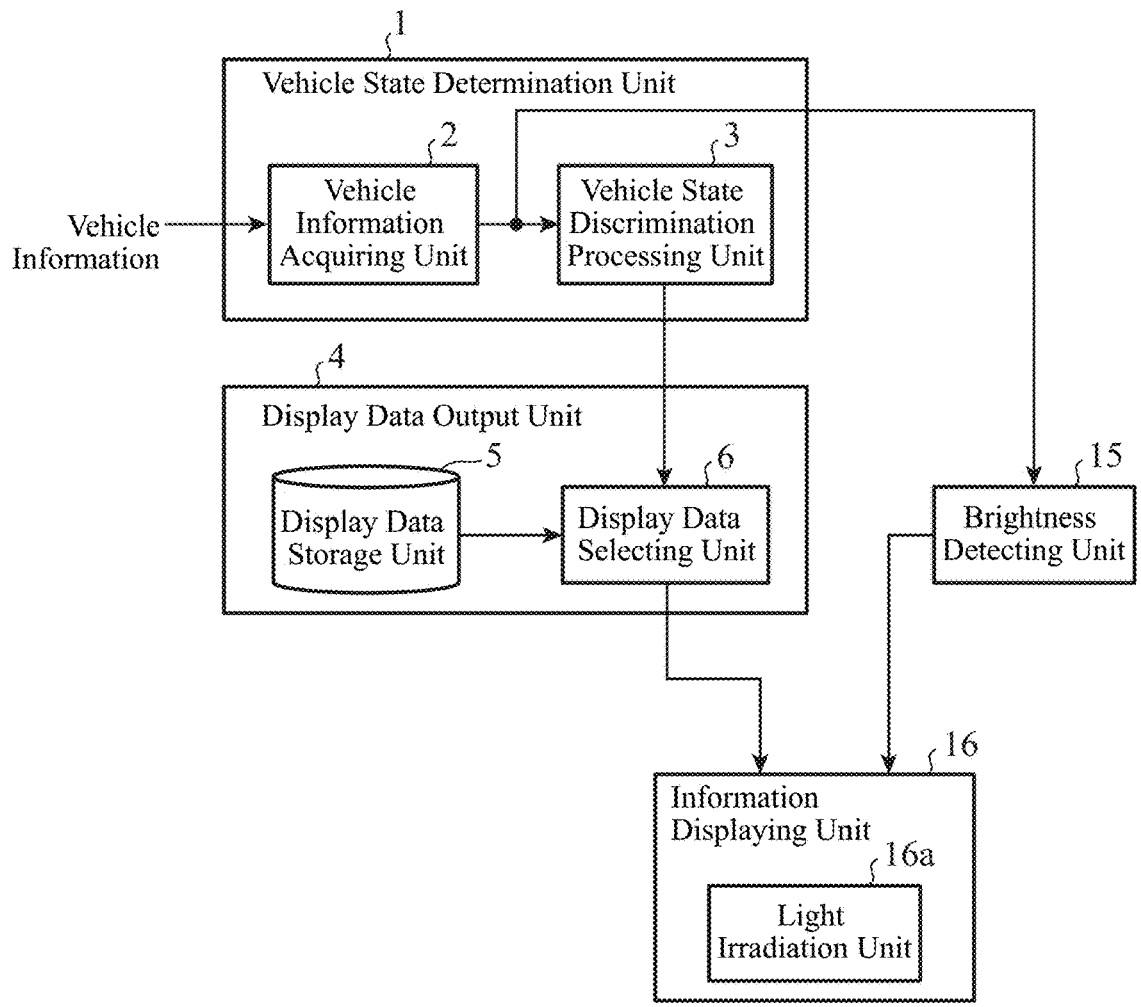
FIG. 15 is a configuration diagram illustrating an information display device according to a fifth embodiment of the present invention.
Figure 16:
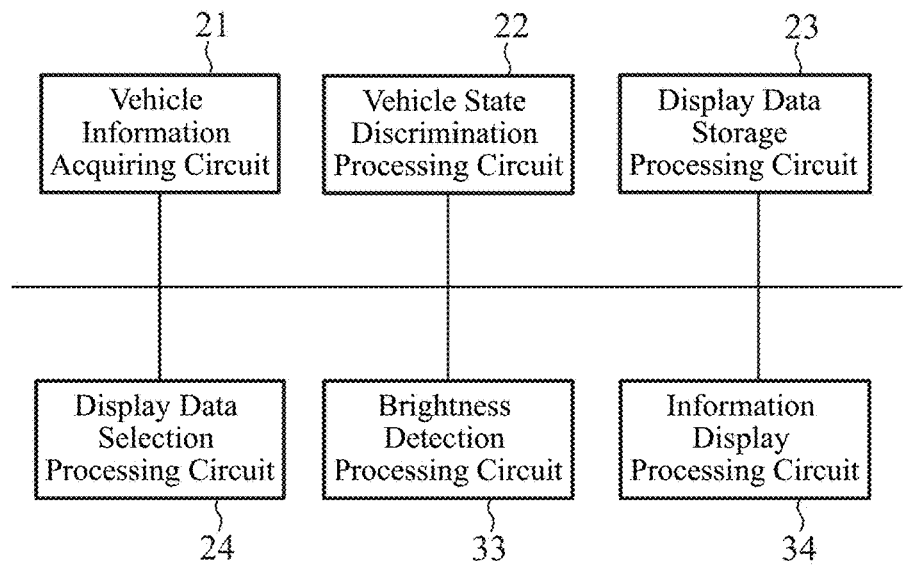
FIG. 16 is a hardware configuration diagram of the information display device according to the fifth embodiment of the present invention.

FIG. 15 is a configuration diagram illustrating an information display device according to the fifth embodiment of the present invention, and FIG. 16 is a hardware configuration diagram of the information display device according to the fifth embodiment of the present invention.

In FIGS. 15 and 16, the same reference signs as those in FIGS. 1 and 2 represent the same or corresponding parts, so that the description thereof is omitted.

A brightness detecting unit 15 implemented by, for example, a brightness detection processing circuit 33 in FIG. 16 formed of a semiconductor integrated circuit on which a CPU is mounted, a one-chip microcomputer or the like, performs processing of detecting the brightness around the vehicle as the environment of the vehicle.

An information displaying unit 16 implemented by an information display processing circuit 34 in FIG. 16, for example, performs processing of displaying information to the outside of the vehicle in accordance with display data output from a display data output unit 4.

That is, the information displaying unit 16 includes a light irradiation unit 16*a* which displays information indicating a state of the vehicle on a projection surface by irradiating the projection surface outside the vehicle with, for example, laser light or LED light to in accordance with the display data output from the display data output unit 4.

The light irradiation unit 16*a* of the information displaying unit 16 changes the brightness, a hue, or a type of the light irradiated to the projection surface in accordance with the brightness detected by the brightness detecting unit 15.

In FIG. 15, a vehicle information acquiring unit 2, a vehicle state determination processing unit 3, a display data storage unit 5, a display data selecting unit 6, the brightness detecting unit 15, and the information displaying unit 16 being components of the information display device are assumed to be implemented by dedicated hardware as illustrated in FIG. 16, that is, a vehicle information acquiring circuit 21, a vehicle state determination processing circuit 22, a display data storage processing circuit 23, a display data selection processing circuit 24, the brightness detection processing circuit 33, and the information display processing circuit 34, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 5 may be configured on the memory 41 of the computer illustrated in FIG. 3 and a program for allowing the computer to execute procedures of the vehicle information acquiring unit 2, the vehicle state determination processing unit 3, the display data selecting unit 6, the brightness detecting unit 15, and the information displaying unit 16 may be stored in the memory 41, and the processor 42 may execute the program stored in the memory 41.

Operation is next described.

However, the components other than the brightness detecting unit 15 and the information displaying unit 16 are similar to those of the above-described first embodiment, so that processing content of the brightness detecting unit 15 and the information displaying unit 16 is herein described.

The brightness detecting unit 15 detects the brightness around the vehicle as the environment of the vehicle.

For example, the brightness detecting unit 15 detects the brightness around the vehicle from information of a brightness sensor included in vehicle information acquired by the vehicle information acquiring unit 2.

The information displaying unit 16 displays the information to the outside of the vehicle in accordance with the display data output from the display data output unit 4.

That is, the light irradiation unit 16a of the information displaying unit 16 displays information indicating a state of the vehicle on the projection surface by irradiating the projection surface outside the vehicle with the laser light or the LED light, for example, in accordance with the display data output from the display data output unit 4.

At that time, the light irradiation unit 16a of the information displaying unit 16 changes the brightness, the hue, or the type of the light irradiated to the projection surface in accordance with the brightness detected by the brightness detecting unit 15.

For example, when the brightness detected by the brightness detecting unit 15 is high, the light irradiation unit 16a of the information displaying unit 16 increases the brightness of the light irradiated to the projection surface. Alternatively, a color of the light irradiated to the projection surface is changed to the hue with high illuminance such as yellow-green or light blue. Alternatively, for example, the laser light is used as the type of the light with high illuminance.

When the brightness detected by the brightness detecting unit 15 is low, the light irradiation unit 16a of the information displaying unit 16 decreases the brightness of the light irradiated to the projection surface. Alternatively, the color of the light irradiated to the projection surface is changed to the hue with low illuminance. Alternatively, for example, the LED light with illuminance lower than that of the laser light is used as the type of the light with low illuminance.

Meanwhile, when a light such as a headlight, a blinker, and a tail lamp is lit, the light irradiation unit 16a does not irradiate light of the same color as the light emitted by each light.

That is, this avoids irradiation of white light when the headlight is lit, avoids irradiation of orange light when the blinker is lit, and avoid irradiation of red light when the tail lamp is lit.

Also, the light irradiation unit 16a may also irradiate the road surface with the light with illuminance higher than that of the light emitted by each light.

As is clear from the above description, according to the fifth embodiment, the brightness detecting unit 15 which detects the brightness around the vehicle as the environment of the vehicle is provided, and the information displaying unit 16 is configured to change the brightness, the hue, or the type of the light irradiated to the projection surface in accordance with the brightness detected by the brightness detecting unit 15, so that there is an effect of increasing a degree of information transmission as in the above-described first embodiment.

Sixth Embodiment

In the above-described first embodiment, the projection surface state detecting unit 7 detects the state of the projection surface outside the vehicle as the environment of the vehicle, but in a sixth embodiment, weather is detected as an environment of a vehicle.

Figure 17:
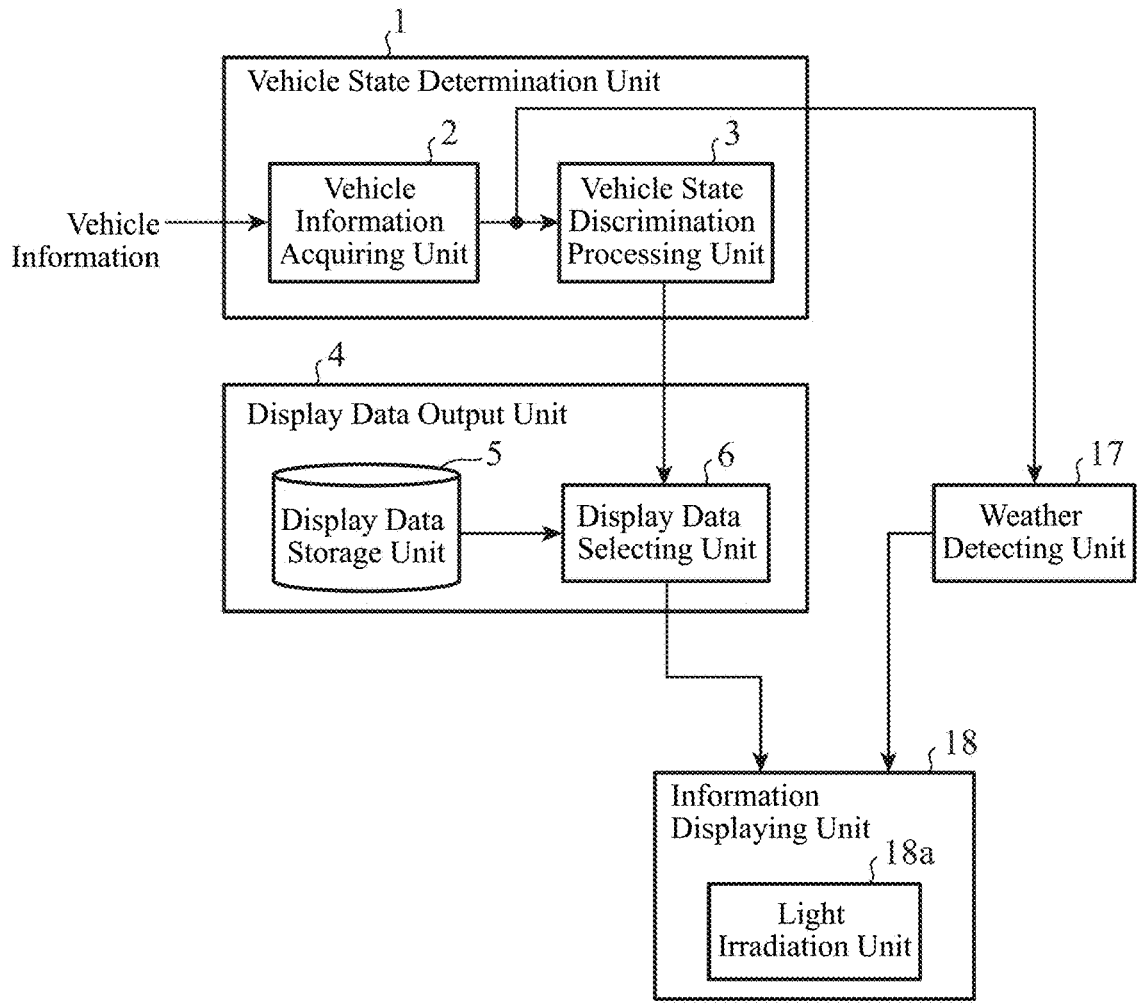
FIG. 17 is a configuration diagram illustrating an information display device according to a sixth embodiment of the present invention.
Figure 18:
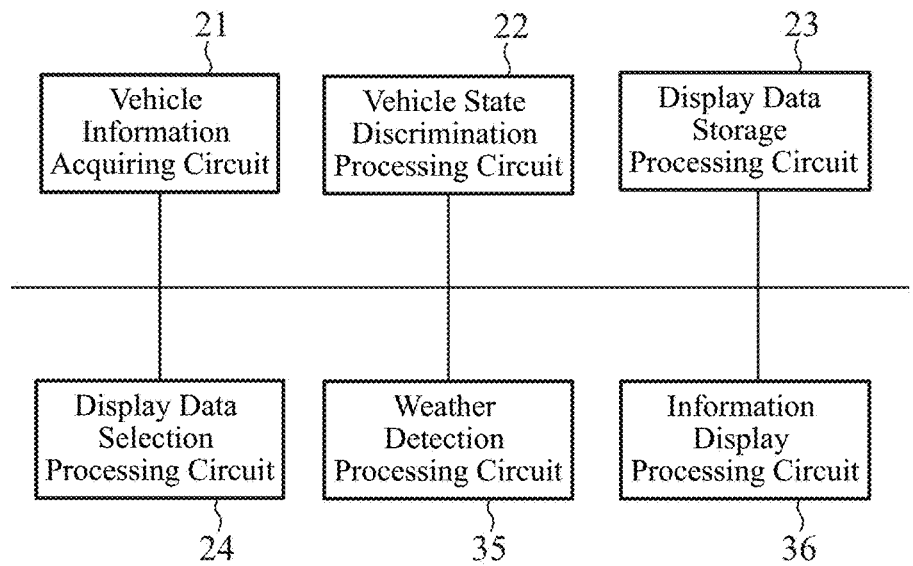
FIG. 18 is a hardware configuration diagram of the information display device according to the sixth embodiment of the present invention.

FIG. 17 is a configuration diagram illustrating an information display device according to the sixth embodiment of the present invention, and FIG. 18 is a hardware configuration diagram of the information display device according to the sixth embodiment of the present invention.

In FIGS. 17 and 18, the same reference signs as those in FIGS. 1 and 2 represent the same or corresponding parts, so that the description thereof is omitted.

A weather detecting unit 17 implemented by, for example, a weather detection processing circuit 35 in FIG. 18 formed of a semiconductor integrated circuit on which a CPU is mounted, a one-chip microcomputer or the like performs processing of detecting the weather as the environment of the vehicle.

The information displaying unit 18 implemented by an information display processing circuit 36 in FIG. 18, for example, performs processing of displaying information to the outside of the vehicle in accordance with display data output from the display data output unit 4.

That is, the information displaying unit 18 includes a light irradiation unit 18a which displays information indicating a state of the vehicle on a projection surface by irradiating the projection surface outside the vehicle with, for example, laser light or LED light in accordance with the display data output from the display data output unit 4.

The light irradiation unit 18a of the information displaying unit 18 changes brightness, a hue, or a type of the light irradiated to the projection surface in accordance with the weather detected by the weather detecting unit 17.

In FIG. 17, a vehicle information acquiring unit 2, a vehicle state determination processing unit 3, a display data storage unit 5, a display data selecting unit 6, the weather detecting unit 17, and the information displaying unit 18 being components of the information display device are assumed to be implemented by dedicated hardware as illustrated in FIG. 18, that is, a vehicle information acquiring circuit 21, a vehicle state determination processing circuit 22, a display data storage processing circuit 23, a display data selection processing circuit 24, the weather detection processing circuit 35, and the information display processing circuit 36.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 5 may be configured on the memory 41 of the computer illustrated in FIG. 3 and a program for allowing the computer to execute procedures of the vehicle information acquiring unit 2, the vehicle state determination processing unit 3, the display data selecting unit 6, the weather detecting unit 17, and the information displaying unit 18 may be stored in the memory 41, and the processor 42 may execute the program stored in the memory 41.

Operation is next described.

However, the components other than the weather detecting unit 17 and the information displaying unit 18 are similar to those of the above-described first embodiment, so that processing content of the weather detecting unit 17 and the information displaying unit 18 is herein described.

The weather detecting unit 17 detects the weather as the environment of the vehicle.

For example, when weather information is included in vehicle information acquired by the vehicle information acquiring unit 2, the weather detecting unit 17 detects the weather from the weather information. Alternatively, the weather is detected by accessing a weather providing site and the like on the Internet.

The information displaying unit 18 displays the information to the outside of the vehicle in accordance with the display data output from the display data output unit 4.

That is, the light irradiation unit 18*a* of the information displaying unit 18 displays the information indicating the state of the vehicle on the projection surface by irradiating the projection surface outside the vehicle with the laser light or the LED light, for example, in accordance with the display data output from the display data output unit 4.

At that time, the light irradiation unit 18*a* of the information displaying unit 18 changes the brightness, the hue, or the type of the light irradiated to the projection surface in accordance with the weather detected by the weather detecting unit 17.

For example, when the weather detected by the weather detecting unit 17 is fine, the light irradiation unit 18*a* of the information displaying unit 18 increases the brightness of the light irradiated to the projection surface, because an influence of irregular reflection due to rainwater and the like is small. Also, as the type of light, for example, the laser light is used.

When the weather detected by the weather detecting unit 17 is cloudy or foggy, the light irradiation unit 18*a* of the information displaying unit 18 uses yellow or the like as a color of the light irradiated to the projection surface. Yellow is known as the color capable of improving visibility when it is cloudy or foggy.

When the weather detected by the weather detecting unit 17 is rainy, the light irradiation unit 18*a* of the information displaying unit 18 uses the LED light, for example, while avoiding using the laser light, because the influence of the irregular reflection caused by the rainwater and the like is great.

Herein, an example is illustrated in which the brightness, the hue, or the type of the light irradiated to the projection surface is changed in accordance with the weather detected by the weather detecting unit 17; however, the brightness, the hue, or the type of the light irradiated to the projection surface may also be changed in accordance with time of day.

For example, it is conceivable to use green, light blue or the like as the color of the light irradiated to the projection surface in twilight.

As is clear from the above description, according to the sixth embodiment, the weather detecting unit 17 which detects the weather as the environment of the vehicle is provided, and the information displaying unit 18 is configured to change the brightness, the hue, or the type of the light irradiated to the projection surface in accordance with the weather detected by the weather detecting unit 17, so that there is an effect of increasing a degree of information transmission as in the above-described first embodiment.

Seventh Embodiment

In the above-described first embodiment, the information displaying unit 8 displays the information to the outside of the vehicle in accordance with the display data, but in a seventh embodiment, a situation around a vehicle is monitored and the display of the information in an information displaying unit 8 is controlled in accordance with a monitoring result of the situation.

Figure 19:
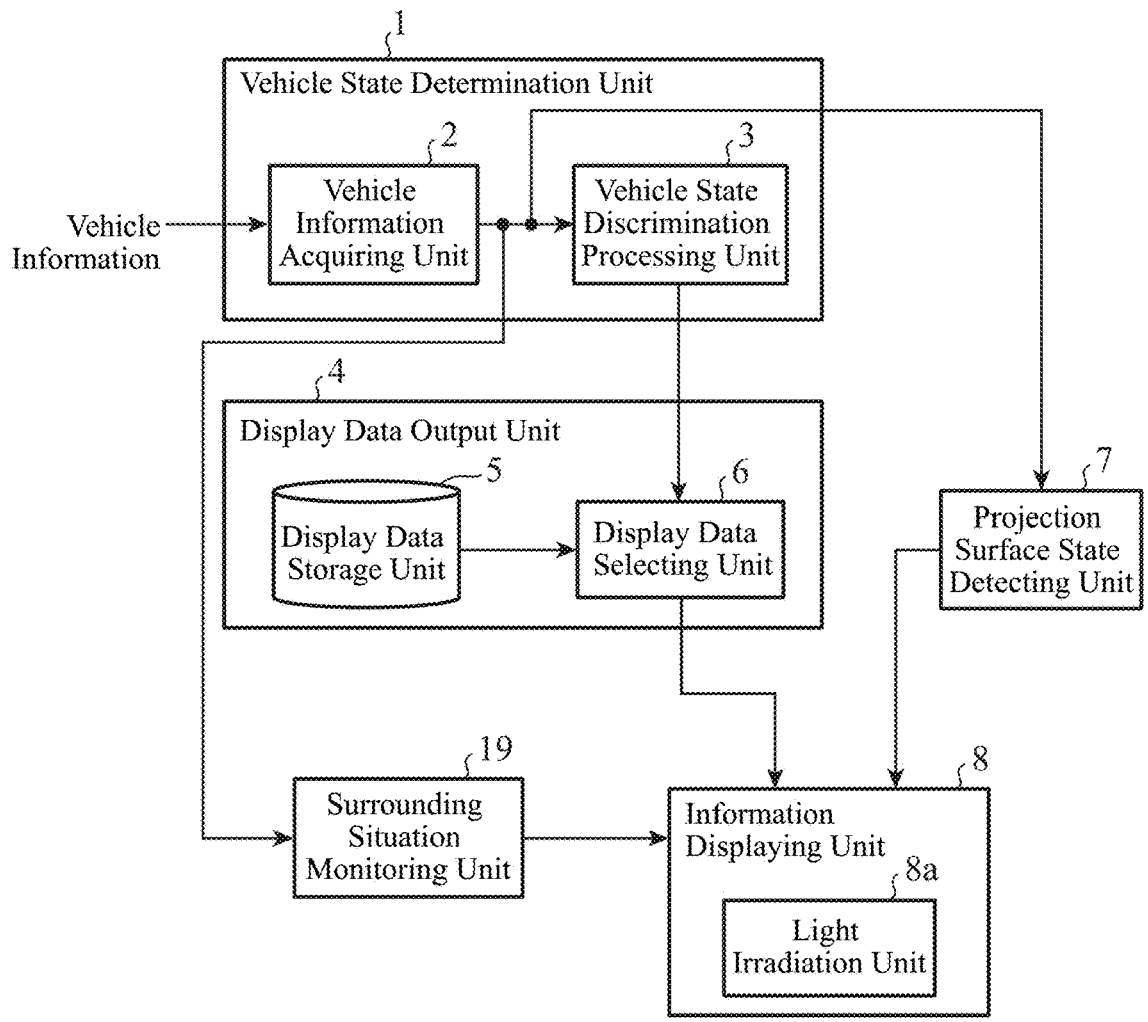
FIG. 19 is a configuration diagram illustrating an information display device according to a seventh embodiment of the present invention.
Figure 20:
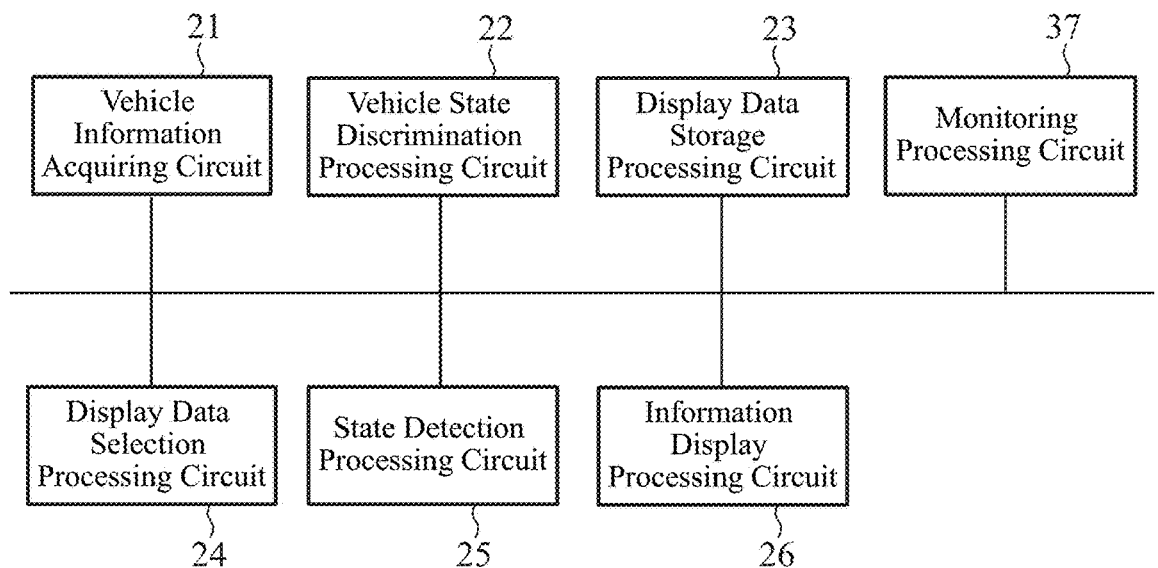
FIG. 20 is a hardware configuration diagram of the information display device according to the seventh embodiment of the present invention.

FIG. 19 is a configuration diagram illustrating an information display device according to the seventh embodiment of the present invention, and FIG. 20 is a hardware configuration diagram of the information display device according to the seventh embodiment of the present invention.

In FIGS. 19 and 20, the same reference signs as those in FIGS. 1 and 2 represent the same or corresponding parts, so that the description thereof is omitted.

A surrounding situation monitoring unit 19 implemented by, for example, a monitoring processing circuit 37 in FIG. 20 formed of a semiconductor integrated circuit on which a CPU is mounted, a one-chip microcomputer or the like, performs processing of monitoring a situation around the vehicle by visual information of a camera which takes a photograph of the surroundings of the vehicle out of vehicle information acquired by a vehicle information acquiring unit 2 and controlling display of the information in the information displaying unit 8 in accordance with a monitoring result of the situation around the vehicle.

In the seventh embodiment, an example in which the surrounding situation monitoring unit 19 is used to the information display device of the above-described first embodiment is described, but the surrounding situation monitoring unit 19 may also be used to the information display devices of the above-described second to sixth embodiments.

In FIG. 19, it is supposed that a vehicle information acquiring unit 2, a vehicle state determination processing unit 3, a display data storage unit 5, a display data selecting unit 6, a projection surface state detecting unit 7, the surrounding situation monitoring unit 19, and the information displaying unit 8 being components of the information display device are implemented by dedicated hardware illustrated in FIG. 20, that is, a vehicle information acquiring circuit 21, a vehicle state determination processing circuit 22, a display data storage processing circuit 23, a display data selection processing circuit 24, a state detection processing circuit 25, the monitoring processing circuit 37, and an information display processing circuit 26, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 5 may be configured on the memory 41 of the computer illustrated in FIG. 3 and a program for allowing the computer to execute procedures of the vehicle information acquiring unit 2, the vehicle state determination processing unit 3, the display data selecting unit 6, the projection surface state detecting unit 7, the surrounding situation monitoring unit 19, and the information displaying unit 8 may be stored in the memory 41, and the processor 42 of the computer may execute the program stored in the memory 41.

Operation is next described.

However, the components other than the surrounding situation monitoring unit 19, the operation are similar to those of the above-described first embodiment, so that processing content of the surrounding situation monitoring unit 19 is herein described.

The surrounding situation monitoring unit 19 monitors the situation around the vehicle by the visual information of the camera which takes a photograph of the surroundings of the vehicle out of vehicle information acquired by the vehicle information acquiring unit 2.

By executing a well-known object recognition processing algorithm, the surrounding situation monitoring unit 19 detects other vehicles, pedestrians and the like present in the image from the visual information of the camera.

When other vehicles, pedestrians and the like are present around a user's vehicle, for example, in front of, lateral to, lateral front side of, lateral rear side of, and behind the vehicle, the surrounding situation monitoring unit 19 allows the information displaying unit 8 to execute processing of displaying the information in accordance with the display data.

When no other vehicle, pedestrian or the like is present around the user's vehicle, the surrounding situation monitoring unit 19 allows the information displaying unit 8 to stop executing the processing of displaying the information.

As a result, in a case in which there is no other party to present the information such as a case in which there is no other vehicle, pedestrian or the like around the user's vehicle, useless information display may be stopped.

Eighth Embodiment

In the above-described first embodiment, the information displaying unit 8 displays the information to the outside of the vehicle in accordance with the display data, but in an eighth embodiment, display data output from a display data output unit 4 is processed in accordance with a state of a vehicle determined by a vehicle state determination unit 1 and information is displayed to the outside of the vehicle in accordance with the processed display data.

Figure 21:
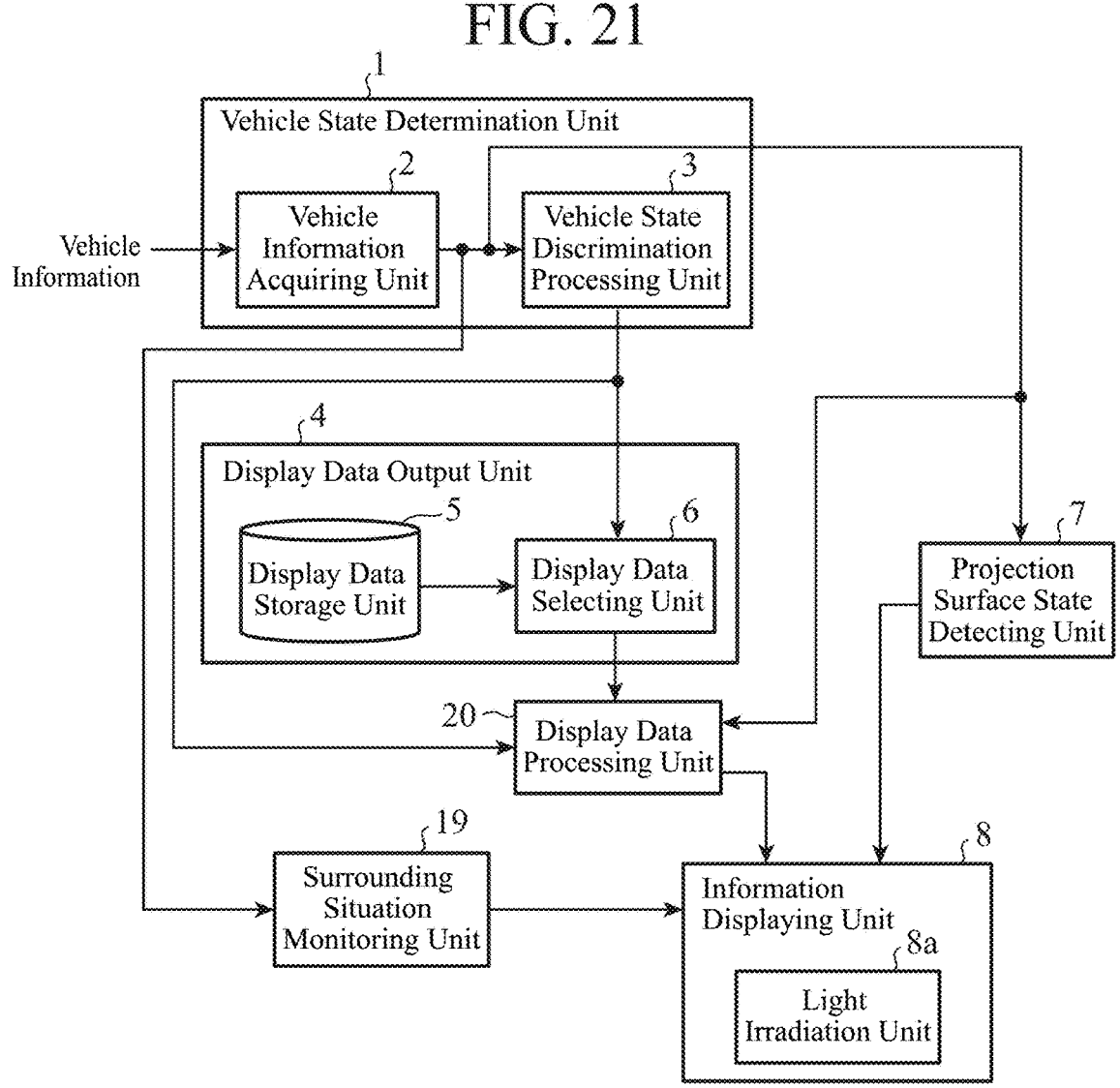
FIG. 21 is a configuration diagram illustrating an information display device according to an eighth embodiment of the present invention.
Figure 22:
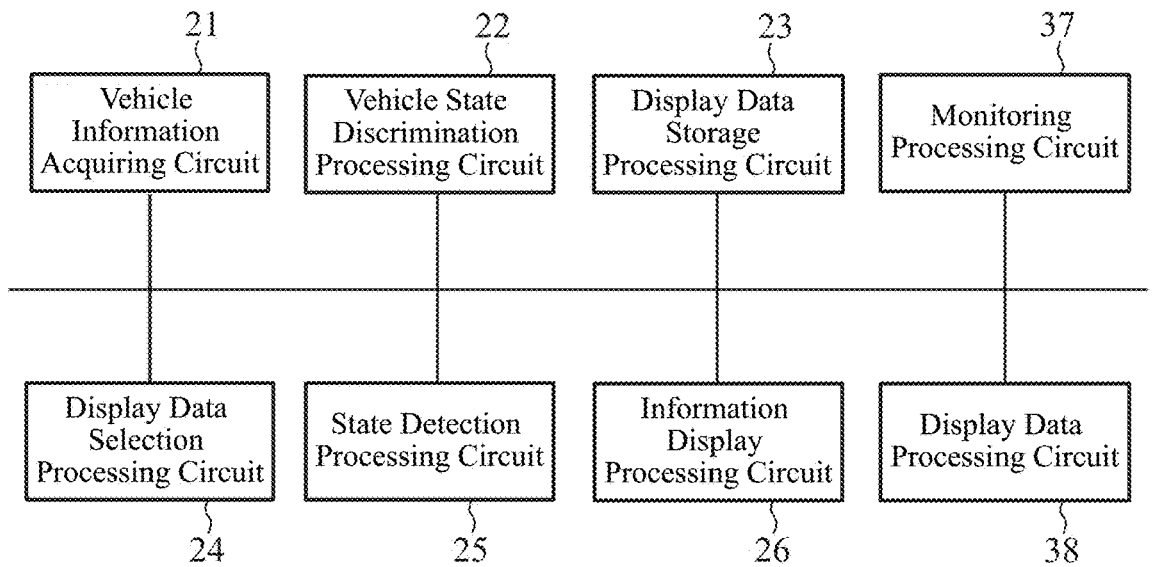
FIG. 22 is a hardware configuration diagram of the information display device according to the eighth embodiment of the present invention.

FIG. 21 is a configuration diagram illustrating an information display device according to the eighth embodiment of the present invention, and FIG. 22 is a hardware configuration diagram of the information display device according to the eighth embodiment of the present invention.

In FIGS. 21 and 22, the same reference signs as those in FIGS. 1, 2, 19, and 20 represent the same or corresponding parts, so that the description thereof is omitted.

A display data processing unit 20 implemented by, for example, a display data processing circuit 38 in FIG. 22 formed of a semiconductor integrated circuit on which a CPU is mounted, one-chip microcomputer or the like performs processing of processing the display data output from the display data output unit 4 in accordance with vehicle information acquired by a vehicle information acquiring unit 2 or a state of the vehicle determined by the vehicle state determination processing unit 3 and outputting the processed display data to the information displaying unit 8.

In the eighth embodiment, an example in which the display data processing unit 20 is used to the information display device of the above-described seventh embodiment is described, but the display data processing unit 20 may also be used to the information display devices of the above-described first to sixth embodiments.

In FIG. 21, it is supposed that the vehicle information acquiring unit 2, the vehicle state determination processing unit 3, a display data storage unit 5, a display data selecting unit 6, the display data processing unit 20, a projection surface state detecting unit 7, a surrounding situation monitoring unit 19, and the information displaying unit 8 being components of the information display device are implemented by dedicated hardware illustrated in FIG. 20, that is, a vehicle information acquiring circuit 21, a vehicle state determination processing circuit 22, a display data storage processing circuit 23, a display data selection processing circuit 24, the display data processing circuit 38, a state detection processing circuit 25, a monitoring processing circuit 37, and an information display processing circuit 26, respectively.

However, the components of the information display device are not limited to those implemented by the dedicated hardware, and the information display device may also be implemented by software, firmware, or a combination of the software and firmware.

In a case in which the information display device is implemented by the software, firmware and the like, the display data storage unit 5 may be configured on the memory 41 of the computer illustrated in FIG. 3 and a program for allowing the computer to execute procedures of the vehicle information acquiring unit 2, the vehicle state determination processing unit 3, the display data selecting unit 6, the display data processing unit 20, the projection surface state detecting unit 7, the surrounding situation monitoring unit 19, and the information displaying unit 8 may be stored in the memory 41, and the processor 42 of the computer may execute the program stored in the memory 41.

Operation is next described.

However, the components other than the display data processing unit 20 are similar to those in the above-described first embodiment, so that processing content of the display data processing unit 20 is mainly herein described.

When the display data processing unit 20 receives the display data from the display data selecting unit 6, this processes the display data in accordance with the vehicle information acquired by the vehicle information acquiring unit 2 or the state of the vehicle determined by the vehicle state determination processing unit 3 and outputs the processed display data to the information displaying unit 8.

That is, for example, the display data processing unit 20 processes the display data on the basis of a speed of the vehicle included in the vehicle information acquired by the vehicle information acquiring unit 2.

Specifically, for example, as the vehicle speed increases, the display data is processed so as to enlarge a range of light to be irradiated to a road surface such that the information is displayed in a wider range, and visibility in a case of high-speed travel is improved.

Also, as the speed of the vehicle increases, the display data is processed such that a playback speed of animation increases, for example, thereby transmitting a sense of speed of the vehicle.

The display data processing unit 20 also processes the display data in accordance with the state of the vehicle determined by the vehicle state determination processing unit 3.

Specifically, for example, in a case in which the vehicle is in a state of starting from an on-street parking state, the display data is processed such that a display position of a symbol and the like indicating a starting sign of the vehicle is changed, thereby enabling intuitive understanding of vehicle start. For example, the display position of the symbol indicating the starting sign of the vehicle is changed from a road surface on the right side of the vehicle→the road surface slightly forward on the right→the road surface on the right front side→ . . . →the road surface on the right side→the road surface slightly forward on the right→the road surface on the right front side.

Upon receiving the processed display data from the display data processing unit 20, the information displaying unit 8 displays the information to the outside of the vehicle in accordance with the display data as in the above-described first embodiment.

As is clear from the above description, according to the eighth embodiment, the display data processing unit 20 which processes the display data output from the display data output unit 4 in accordance with the vehicle information acquired by the vehicle information acquiring unit 2 or the state of the vehicle determined by the vehicle state determination processing unit 3 is provided, and the information displaying unit 8 is configured to display the information to the outside of the vehicle in accordance with the display data processed by the display data processing unit 20, so that an effect similar to that of the above-described first embodiment may be obtained and there is an effect of increasing the visibility of the information depending on the state of the vehicle.

Meanwhile, in the invention of the present application, embodiments may be freely combined, any component of each embodiment may be modified, or any component may be omitted in each embodiment without departing from the scope of the invention.

INDUSTRIAL APPLICABILITY

The information display device and information display method according to the present invention are suitable for use in displaying the information to the outside of the vehicle.

REFERENCE SIGNS LIST

1: Vehicle state determination unit, 2: Vehicle information acquiring unit, 3: Vehicle state determination processing unit, 4: Display data output unit, 5: Display data storage unit, 6: Display data selecting unit, 7: Projection surface state detecting unit, 8: Information displaying unit, 8a: Light irradiation unit, 9: Obstacle detecting unit, 10: Information displaying unit, 10a: Light irradiation unit, 11: Road shape detecting unit, 12: Information displaying unit, 12a: Light irradiation unit, 13: Speed limit detecting unit, 14: Information displaying unit, 14a: Light irradiation unit, 15: Brightness detecting unit, 16: Information displaying unit, 16a: Light irradiation unit, 17: Weather detecting unit, 18: Information displaying unit, 18a: Light irradiation unit, 19: Surrounding situation monitoring unit, 20: Display data processing unit, 21: Vehicle information acquiring circuit, 22: Vehicle state determination processing circuit, 23: Display data storage processing circuit, 24: Display data selection processing circuit, 25: State detection processing circuit, 26: Information display processing circuit, 27: Obstacle detection processing circuit, 28: Information display processing circuit, 29: Shape detection processing circuit, 30: Information display processing circuit, 31: Speed limit detection processing circuit, 32: Information display processing circuit, 33: Brightness detection processing circuit, 34: Information display processing circuit, 35: Weather detection processing circuit, 36: Information display processing circuit, 37: Monitoring processing circuit, 38: Display data processing circuit, 41: Memory, 42: Processor

The invention claimed is:

1. An information display device, comprising:
a processor; and
a memory storing instructions which, when executed by the processor, causes the processor to perform processes of:
determining a state of a vehicle;
outputting display data for displaying information indicating the determined state of the vehicle;
detecting a speed limit of a road on which the vehicle travels as an environment of the vehicle; and
an information display to display information to an outside of the vehicle in accordance with the output display data,
wherein the information display includes a light irradiation unit to display the information indicating the state of the vehicle on a projection surface by irradiating the projection surface outside the vehicle with light in accordance with the output display data and
the light irradiation unit switches an angle of the light irradiated to the projection surface in accordance with the detected speed limit, wherein when the speed limit is high, the light irradiation unit changes the angle of light so that the projection surface is irradiated with light at a position farther from the vehicle than when the speed limit is low.

2. The information display device according to claim 1, wherein the processor further performs processes of:
detecting a state of the projection surface outside the vehicle as the environment of the vehicle,
wherein the light irradiation unit switches the angle or brightness of the light irradiated to the projection surface in accordance with the detected state.

3. The information display device according to claim 1, wherein the processor further performs processes of:
detecting a state of the projection surface outside the vehicle as the environment of the vehicle,
wherein the light irradiation unit switches the projection surface in accordance with the detected state.

4. The information display device according to claim 1, wherein the processor further performs processes of:
detecting an obstacle around the vehicle as the environment of the vehicle,
wherein the light irradiation unit switches the projection surface in accordance with an obstacle detection result.

5. The information display device according to claim 1, wherein the processor further performs processes of:
detecting a shape of a road on which the vehicle travels as the environment of the vehicle,
wherein the light irradiation unit controls irradiation of the light such that a shape based on information to be displayed on the projection surface changes in accordance with the detected shape of the road.

6. The information display device according to claim 1, wherein the processor further performs processes of:
detecting brightness around the vehicle as the environment of the vehicle,
wherein the light irradiation unit changes brightness, a hue, or a type of the light irradiated to the projection surface in accordance with the detected brightness.

7. The information display device according to claim 1, wherein the processor further performs processes of:
detecting weather as the environment of the vehicle,
wherein the light irradiation unit changes brightness, a hue, or a type of the light irradiated to the projection surface in accordance with the detected weather.

8. The information display device according to claim 1, wherein a display medium of information in the information display is a road surface around the vehicle, a body of the vehicle, a window of the vehicle, a display tool formed of a plurality of light emitting devices attached to the vehicle, or a display attached to the vehicle, and
the information display displays the information on the road surface, the body of the vehicle, the window of the vehicle, the display tool, or the display.

9. The information display device according to claim 1, wherein the processor further performs processes of:
monitoring a situation around the vehicle and controlling display of the information in the information display in accordance with a monitoring result of the situation.

10. The information display device according to claim 1, comprising:
wherein the processor further performs processes of:
processing the output display data in accordance with the state of the vehicle,
wherein the information display displays the information to the outside of the vehicle in accordance with the processed display data.

11. An information display method, comprising:
determining a state of a vehicle;
outputting display data for displaying information indicating the determined state of the vehicle;
detecting a speed limit of a road on which the vehicle travels as an environment of the vehicle;
displaying the information indicating the state of the vehicle on a projection surface by irradiating the projection surface outside the vehicle with light in accordance with the output display data; and
switching an angle of the light irradiated to the projection surface in accordance with the detected speed limit,
changing, when the speed limit is high, the angle of light, the angle of light, so that the projection surface is irradiated with light at a position farther from the vehicle than when the speed limit is low.

* * * * *